United States Patent
Nigo

(10) Patent No.: US 12,040,680 B2
(45) Date of Patent: Jul. 16, 2024

(54) COMPRESSOR AND AIR CONDITIONER

(71) Applicant: Mitsubishi Electric Corporation, Tokyo (JP)

(72) Inventor: Masahiro Nigo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 254 days.

(21) Appl. No.: 17/612,287

(22) PCT Filed: Jun. 13, 2019

(86) PCT No.: PCT/JP2019/023501
§ 371 (c)(1),
(2) Date: Nov. 18, 2021

(87) PCT Pub. No.: WO2020/250383
PCT Pub. Date: Dec. 17, 2020

(65) Prior Publication Data
US 2022/0224193 A1    Jul. 14, 2022

(51) Int. Cl.
*H02K 5/22*    (2006.01)
*F04C 29/00*    (2006.01)
(Continued)

(52) U.S. Cl.
CPC ......... *H02K 5/225* (2013.01); *F04C 29/0085* (2013.01); *H02K 5/08* (2013.01);
(Continued)

(58) Field of Classification Search
CPC .... F04C 23/02; F04C 29/0085; F04C 23/008; F04C 2240/803; F04C 2240/30;
(Continued)

(56) References Cited

U.S. PATENT DOCUMENTS 6,533,558 B1 * 3/2003 Matsumoto ............ H02K 1/146
417/410.3
9,028,225 B2 * 5/2015 Yamada .................. F04B 35/04
417/902

(Continued)

FOREIGN PATENT DOCUMENTS

CA    2697839 A1    9/2010
CN    101854015 A    10/2010
(Continued)

OTHER PUBLICATIONS

Office Action issued on Sep. 5, 2023 in connection with counterpart Chinese Patent Application No. 201980097125.1 (and English machine translation).

(Continued)

*Primary Examiner* — Alex W Mok
(74) *Attorney, Agent, or Firm* — Posz Law Group, PLC

(57) ABSTRACT

A compressor includes a motor including three-phase coils having 6N terminals (where N is an integer), a compression mechanism configured to be driven by the motor, a closed container in which the motor and the compression mechanism are housed, a terminal portion electrically connected to the 6N terminals of the coils and protruding outside the closed container, a conductor portion attached to at least a part of the terminal portion to thereby fix a connection state of the coils, and an insulating body covering at least the conductor portion.

16 Claims, 29 Drawing Sheets

(51) Int. Cl.
    *H02K 5/08*     (2006.01)
    *H02K 11/33*     (2016.01)

(52) U.S. Cl.
    CPC ........ *H02K 11/33* (2016.01); *F04C 2240/403* (2013.01); *F04C 2240/803* (2013.01); *F04C 2240/808* (2013.01)

(58) Field of Classification Search
    CPC .............. F04C 18/356; F04C 2240/808; F04C 2240/40; F04C 2240/403; F04B 39/00; H02K 5/08; H02K 11/33; H02K 3/28; H02K 5/225; H02K 16/04; H02K 7/14
    USPC .......................................................... 310/71
    See application file for complete search history.

(56) References Cited

U.S. PATENT DOCUMENTS

| | | | | |
|---|---|---|---|---|
| 9,444,174 | B2* | 9/2016 | Ueno | ..................... H01R 13/46 |
| 9,719,509 | B2* | 8/2017 | Yano | ..................... H01R 13/40 |
| 2007/0269328 | A1* | 11/2007 | Hasegawa | ............. F04C 29/026 |
| | | | | 418/83 |
| 2010/0244598 | A1 | 9/2010 | Nass et al. | |
| 2013/0004345 | A1* | 1/2013 | Horiba | ................... H02K 5/225 |
| | | | | 417/411 |
| 2013/0121815 | A1* | 5/2013 | Tsuboi | ................... H02K 3/522 |
| | | | | 415/191 |
| 2013/0243626 | A1* | 9/2013 | Kim | ........................ F04B 35/04 |
| | | | | 310/71 |
| 2014/0132097 | A1* | 5/2014 | Ueno | ................... H01R 24/005 |
| | | | | 439/682 |
| 2014/0294628 | A1* | 10/2014 | Yano | ................... F04C 18/0215 |
| | | | | 417/410.5 |
| 2017/0110944 | A1* | 4/2017 | Nigo | ........................ F25B 31/02 |
| 2017/0179802 | A1* | 6/2017 | Fujisue | ................... F25B 13/00 |
| 2018/0091016 | A1* | 3/2018 | Fujii | ........................ F25B 31/02 |

FOREIGN PATENT DOCUMENTS

| | | |
|---|---|---|
| JP | 858-162788 U | 10/1983 |
| JP | H11-69701 A | 3/1999 |
| JP | 2000-232745 A | 8/2000 |
| JP | 2002-044892 A | 2/2002 |
| JP | 2010-246370 A | 10/2010 |
| JP | 2015-012630 A | 1/2015 |
| JP | 2016-099029 A | 5/2016 |

OTHER PUBLICATIONS

Office Action issued on Jan. 10, 2023 in connection with counterpart Japanese Patent Application No. 2021-525509 (and English machine translation).

Office Action issued Dec. 2, 2022 in counterpart Chinese Patent Application No. 201980097125.1 (and English machine translation).

Office Action issued on Jul. 26, 2022 in connection with counterpart Japanese Patent Application No. 2021-525509 (and English machine translation).

International Search Report dated Sep. 17, 2019, issued in corresponding International Patent Application No. PCT/JP2019/023501 (and English Machine Translation).

Reconsideration Report drafted on Apr. 18, 2023 in connection with counterpart Japanese Patent Application No. 2021-525509 (and English machine translation).

Office Action issued Apr. 23, 2023 in connection with counterpart Chinese Patent Application No. 201980097125 .1 (and English translation).

Office Action dated Mar. 12, 2024 issued in corresponding Japanese Patent Application No. JP 2021-525509 (and English machine translation).

* cited by examiner

COMPRESSOR AND AIR CONDITIONER

CROSS REFERENCE TO RELATED APPLICATION

This application is a U.S. National Stage Application of International Application No. PCT/JP2019/023501 filed on Jun. 13, 2019, the contents of which are incorporated herein by reference.

TECHNICAL FIELD

The present invention relates to a compressor and an air conditioner.

BACKGROUND

Connection states of coils of a motor include a Y connection and a delta connection. In the case of a motor incorporated in a compressor of an air conditioner, one of the Y connection or the delta connection is selected depending on specifications of the compressor (for example, Patent Reference 1).

PATENT REFERENCE

Patent Reference 1: Japanese Patent Application Publication No. 2000-232745

However, it is difficult to change the connection state of the coils after the motor is incorporated in the compressor. Thus, it is difficult to flexibly cope with various specifications of the compressor.

SUMMARY

The present invention is made to solve the problem described above, and an object of the present invention to enable the connection state of coils to be changed in a state where a motor is incorporated in a compressor.

A compressor according to the present invention includes a motor including three-phase coils having 6N terminals (where N is an integer), a compression mechanism driven by the motor, a closed container in which the motor and the compression mechanism are housed, a terminal portion electrically connected to the 6N terminals of the coils and protruding outside the closed container, a conductor portion attached to at least a part of the terminal portion to thereby fix a connection state of the coils, and an insulating body covering the conductor portion.

According to the present invention, the connection state of the coils is fixed by the conductor portion attached to the terminal portion protruding outside the closed container, and thus the connection state of the coils can be changed in a state where the motor is incorporated in the compressor. As a result, it is possible to flexibly cope with various specifications of the compressor.

DETAILED DESCRIPTION

Embodiments of the present invention will be described in detail with reference to the drawings. These embodiments are not intended to limit the present invention.

First Embodiment

Figure 1:
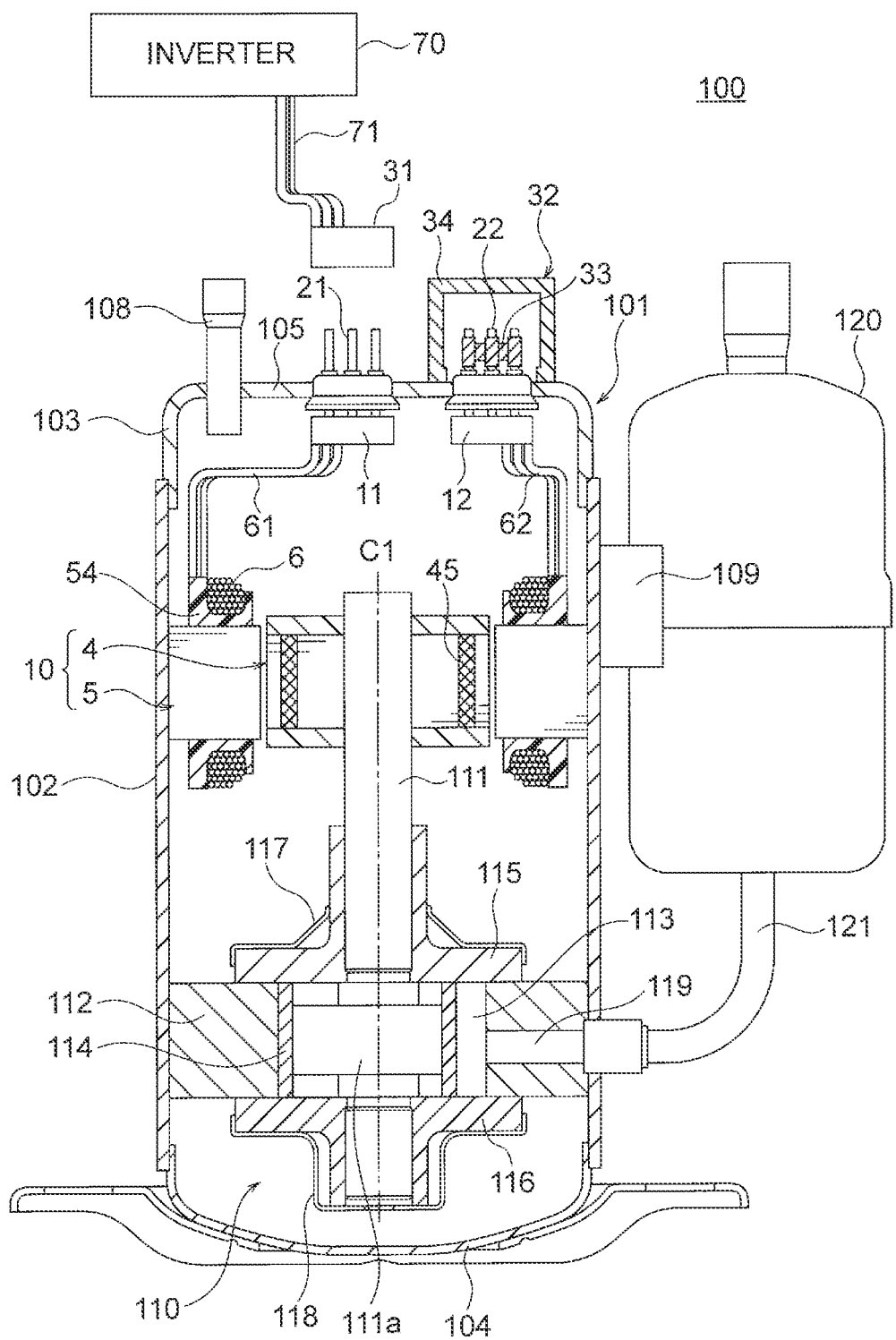
FIG. 1 is a longitudinal sectional view illustrating a compressor according to a first embodiment in which a connection state of coils is fixed to a Y connection.
Figure 30:
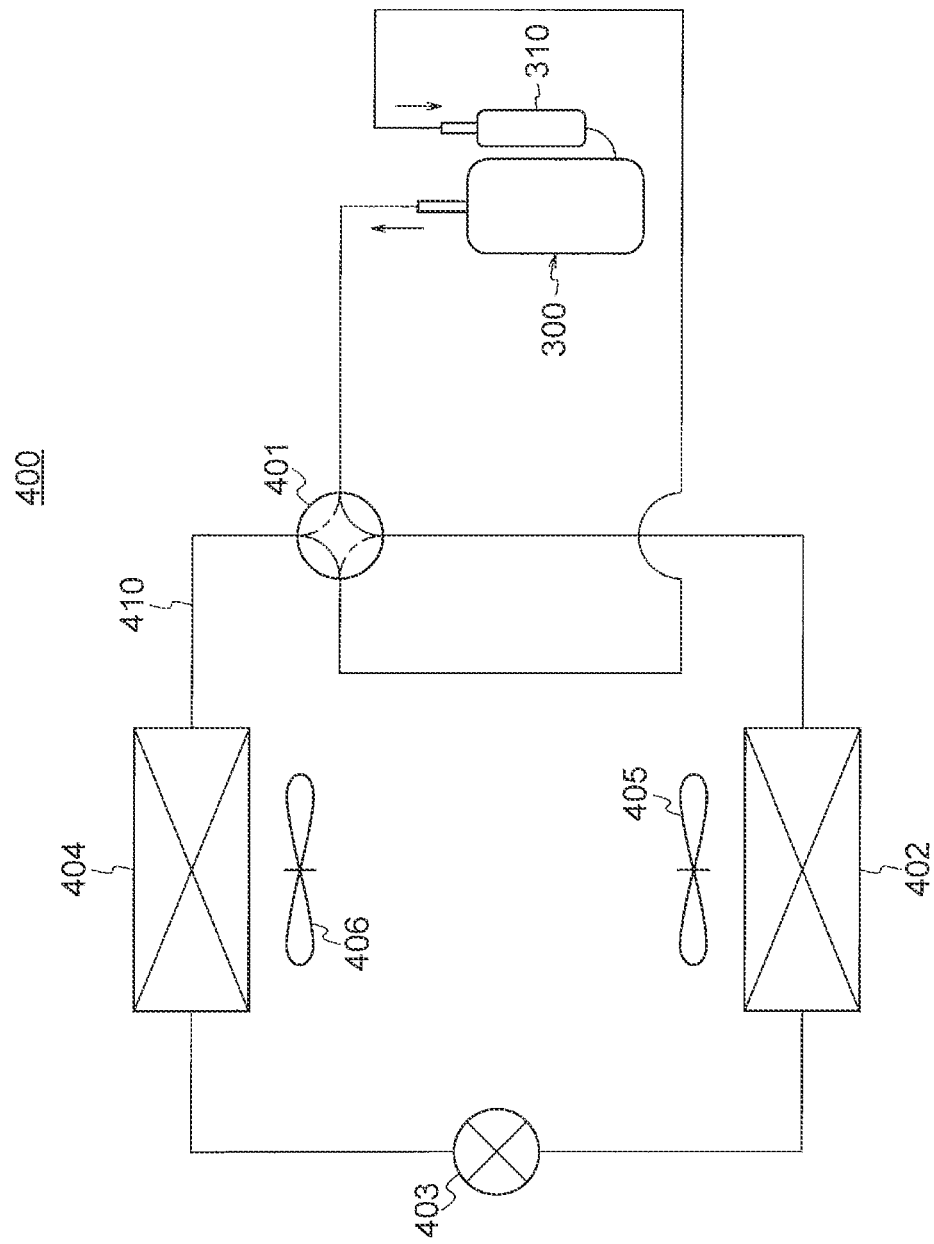
FIG. 30 is a diagram illustrating an air conditioner to which the compressors according to the first through third embodiments are applicable.

FIG. 1 is a longitudinal sectional view illustrating a compressor 100 according to a first embodiment. The compressor 100 is a rotary compressor, and is used for, for example, an air conditioner 400 (FIG. 30). The compressor 100 includes a compression mechanism 110, a motor 10 for driving the compression mechanism 110, a shaft 111 coupling the compression mechanism 110 and the motor 10, and a closed container 101 housing these components. In this example, an axial direction of the shaft 111 is a vertical direction.

In the following description, a direction of a center axis C1 as a rotation center of the shaft 111 will be referred to as an "axial direction." A radial direction about the center axis C1 will be referred to as a "radial direction." A circumferential direction about the center axis C1 will be referred to as a "circumferential direction" and indicated by an arrow R1 in FIG. 2 and other figures. A sectional view in a plane parallel to the center axis C1 will be referred to as a longitudinal sectional view, and a sectional view in a plane perpendicular to the center axis C1 will be referred to as a cross sectional view.

The closed container 101 is a container made of a steel sheet, and includes a cylindrical shell 102, a container top 103 covering an upper portion of the shell 102, and a container bottom 104 covering a lower portion of the shell 102. The motor 10 is incorporated in the shell 102 of the closed container 101 by shrink fitting, press fitting, welding, or the like.

The container top 103 of the closed container 101 is provided with a discharge pipe 108 for ejecting a refrigerant to the outside, and a first terminal portion 21 and a second terminal portion 22 connected to coils 6 of the motor 10. The first terminal portion 21 and the second terminal portion 22 will be described later.

An accumulator 120 for storing a refrigerant gas is attached to the outer side of the closed container 101. A refrigerating machine oil for lubricating bearing portions of the compression mechanism 110 is stored in a bottom portion of the closed container 101.

The compression mechanism 110 includes a cylinder 112 having a cylinder chamber 113, a rolling piston 114 fixed to the shaft 111, a vane dividing the inside of the cylinder chamber 113 into a suction side and a compression side, and an upper frame 115 and a lower frame 116 closing ends of the cylinder chamber 113 in the axial direction.

Each of the upper frame 115 and the lower frame 116 has a bearing portion rotatably supporting the shaft 111. An upper discharge muffler 117 and a lower discharge muffler 118 are respectively attached to the upper frame 115 and the lower frame 116.

The cylinder 112 has the cylinder chamber 113 of a cylindrical shape about the center axis C1. An eccentric shaft portion 111a of the shaft 111 is located inside the cylinder chamber 113. The eccentric shaft portion 111a has a center eccentric with respect to the center axis C1. The rolling piston 114 is fitted onto an outer periphery of the eccentric shaft portion 111a. When the motor 10 rotates, the eccentric shaft portion 111a and the rolling piston 114 eccentrically rotate in the cylinder chamber 113.

The cylinder 112 has a suction port 119 through which a refrigerant gas is sucked into the cylinder chamber 113. A suction pipe 121 communicating with the suction port 119 is attached to the closed container 101, and the refrigerant gas is supplied from the accumulator 120 to the cylinder chamber 113 through the suction pipe 121.

The compressor 100 is supplied with a mixture of a low-pressure refrigerant gas and liquid refrigerant from a refrigerant circuit of the air conditioner 400 (FIG. 30). When the liquid refrigerant flows into the compression mechanism 110 and is compressed therein, it may cause a failure of the compression mechanism 110. Thus, the liquid refrigerant and the refrigerant gas are separated in the accumulator 120, and only the refrigerant gas is supplied to the compression mechanism 110.

As the refrigerant, R410A, R407C, or R22 may be used, for example. From the viewpoint of preventing global warming, a refrigerant having a low global warming potential (GWP) is preferably used. As the low-GWP refrigerant, the following refrigerants can be used, for example.

(1) First, a halogenated hydrocarbon having a carbon double bond in its composition, such as hydro-fluoro-olefin(HFO)-1234yf ($CF_3CF=CH_2$) can be used. The GWP of HFO-1234yf is 4.

(2) Further, a hydrocarbon having a carbon double bond in its composition, such as R1270 (propylene), may be used. The GWP of R1270 is 3, which is lower than that of HFO-1234yf, but the flammability of R1270 is higher than that of HFO-1234yf.

(3) A mixture containing at least one of a halogenated hydrocarbon having a carbon double bond in its composition or a hydrocarbon having a carbon double bond in its composition, such as a mixture of HFO-1234yf and R32, may be used. The above-described HFO-1234yf is a low-pressure refrigerant and tends to increase a pressure loss, which may lead to degradation in performance of a refrigeration cycle (especially an evaporator). Thus, it is practically preferable to use a mixture of HFO-1234yf with R32 or R41, which is a higher-pressure refrigerant than HFO-1234yf.

The compressor 100 is not limited to a rotary compressor, and may be a scroll compressor or the like.

(Configuration of Motor)

Figure 2:
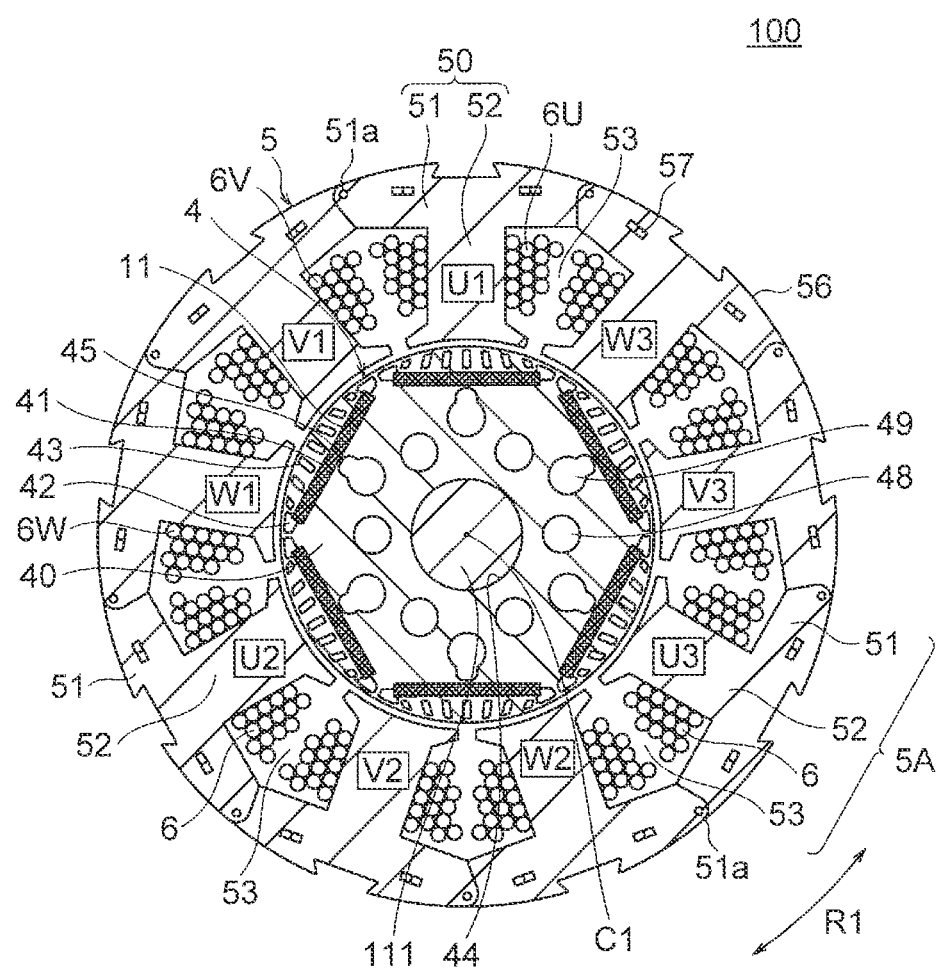
FIG. 2 is a sectional view illustrating a motor according to the first embodiment.

FIG. 2 is a cross sectional view illustrating the motor 10. The motor 10 is a motor called an inner rotor type, and includes a rotor 4 and a stator 5 surrounding the rotor 4 from an outer side in the radial direction. An air gap of, for example, 0.3 to 1.0 mm is formed between the rotor 4 and the stator 5.

The rotor 4 includes a cylindrical rotor core 40 and permanent magnets 45 attached to the rotor core 40. The rotor core 40 is formed by stacking a plurality of steel laminations in the axial direction and integrating the steel laminations by crimping or the like. The steel laminations are, for example, electromagnetic steel sheets. Each of the steel laminations has a thickness of 0.1 to 0.7 mm, and 0.35 mm in this example. A shaft hole 44 is formed at a center of the rotor core 40 in the radial direction, and the shaft 111 described above is fixed in the shaft hole 44 by shrink fitting, press fitting, bonding or the like.

A plurality of magnet insertion holes 41 in which the permanent magnets 45 are inserted are formed along an outer periphery of the rotor core 40. One magnet insertion hole 41 corresponds to one magnetic pole, and a portion between each adjacent two of the magnet insertion holes 41 is an inter-pole portion. The number of magnet insertion holes 41 is six, in this example. In other words, the number of poles is six. It is noted that the number of poles is not limited to six, and only needs to be two or more. Each magnet insertion hole 41 linearly extends in a plane perpendicular to the axial direction.

One permanent magnet 45 is inserted in each magnet insertion hole 41. Each permanent magnet 45 is in the form of a flat plate, and has a width in the circumferential direction of the rotor core 40 and a thickness in the radial direction. The permanent magnet 45 is constituted by, for example, a rare earth magnet containing neodymium (Nd), iron (Fe), and boron (B).

Each of the permanent magnets 45 is magnetized in the thickness direction. The permanent magnets 45 inserted in the adjacent magnet insertion holes 41 have opposite magnetic poles on the outer sides in the radial direction. It is noted that each magnet insertion hole 41 may have, for example, a V shape, and two or more permanent magnets 45 may be disposed in each magnet insertion hole 41.

In the rotor core 40, openings 42 serving as flux barriers are formed at both ends of each magnet insertion hole 41 in the circumferential direction. Thin-walled portions are formed between the openings 42 and the outer periphery of the rotor core 40. Each thin-walled portion has a width so as to reduce short-circuit magnetic fluxes flowing between adjacent magnetic poles. For example, each thin-walled portion has a width equal to the thickness of each steel lamination.

In the rotor core 40, at least one slit 43 is formed between each magnet insertion hole 41 and the outer periphery of the rotor core 40. The slit 43 is formed to reduce an increase in iron loss caused by a rotating magnetic field from the stator 5 and to reduce vibration and noise caused by a magnetic attraction force. In this example, five slits 43 are symmetrically disposed with respect to a center of each magnet insertion hole 41 in the circumferential direction, that is, a pole center. The number and positions of the slits 43 may be varied.

In the rotor core 40, through holes 48 and 49 are formed on the inner side with respect to the magnet insertion holes 41 in the radial direction. Each through hole 48 is formed at a position in the circumferential direction corresponding to the inter-pole portion. Each through hole 49 is formed at a position in the circumferential direction corresponding to the pole center and on the outer side with respect to the through hole 48 in the radial direction. The through holes 48 and 49 are used as air holes through which a refrigerant passes or holes through which jigs are inserted. Six through holes 48 and six through holes 49 are formed in this example, but the numbers and positions of the through holes 48 and 49 may be varied.

The stator 5 includes a stator core 50, and coils 6 wound on the stator core 50. The stator core 50 is formed by stacking a plurality of steel laminations in the axial direction and integrating the steel laminations by crimping or the like. The steel laminations are, for example, electromagnetic steel sheets. Each of the steel laminations has a thickness of 0.1 to 0.7 mm, and 0.35 mm in this example.

The stator core 50 includes a yoke 51 having an annular shape about the center axis Cl, and a plurality of teeth 52 extending inward in the radial direction from the yoke 51. The teeth 52 are arranged at equal intervals in the circumferential direction. The number of teeth 52 is nine in this example. However, the number of the teeth 52 is not limited to nine, and only needs to be two or more. A slot 53 that is a space for accommodating the coil 6 is formed between each two of the teeth 52 adjacent to each other in the circumferential direction. The number of slots 53 is nine, which is equal to the number of the teeth 52. That is, in the motor 10, a ratio of the number of poles and the number of slots is 2:3.

The stator core 50 is formed by coupling a plurality of split cores 5A in the circumferential direction, and each split core 5A includes one tooth 52. The split cores 5A are coupled to each other at coupling portions 51a provided at ends on the outer peripheral side of the yoke 51. Thus, the coils 6 can be wound around the teeth 52 in a state where the stator core 50 is expanded in a band shape. It is noted that the stator core 50 is not limited to a structure in which the split cores 5A are coupled.

The coils 6 are constituted by magnet wires, and wound around the teeth 52 by concentrated winding. Each magnet wire has a wire diameter of, for example, 0.8 mm. The number of turns of the coil 6 around one tooth 52 is, for example, 70 turns. The number of turns and the wire diameter of the coil 6 are determined depending on a rotation speed, a torque or other properties of the motor 10, a supply voltage, or a sectional area of the slot 53. The coils 6 include a U-phase coil 6U, a V-phase coil 6V, and a W-phase coil 6W.

An insulating portion 54 (FIG. 1) made of, for example, a resin such as liquid crystal polymer (LCP) is provided between each end of the stator core 50 in the axial direction and the coils 6. The insulating portion 54 is formed by attaching a resin compact to the stator core 50 or integrally molding the stator core 50 with a resin. Although not shown in FIG. 2, an insulating film having a thickness of 0.1 mm to 0.2 mm and made of a resin such as polyethylene terephthalate (PET) is provided on the inner surface of each slot 53.

As described above, the number of slots (i.e., the number of teeth 52) of the stator 5 is nine, and the number of poles of the rotor 4 is six. That is, in the motor 10, a ratio of the number of poles of the rotor 4 to the number of slots of the stator 5 is 2:3.

(Connection State of Coils 6)

Figure 3:
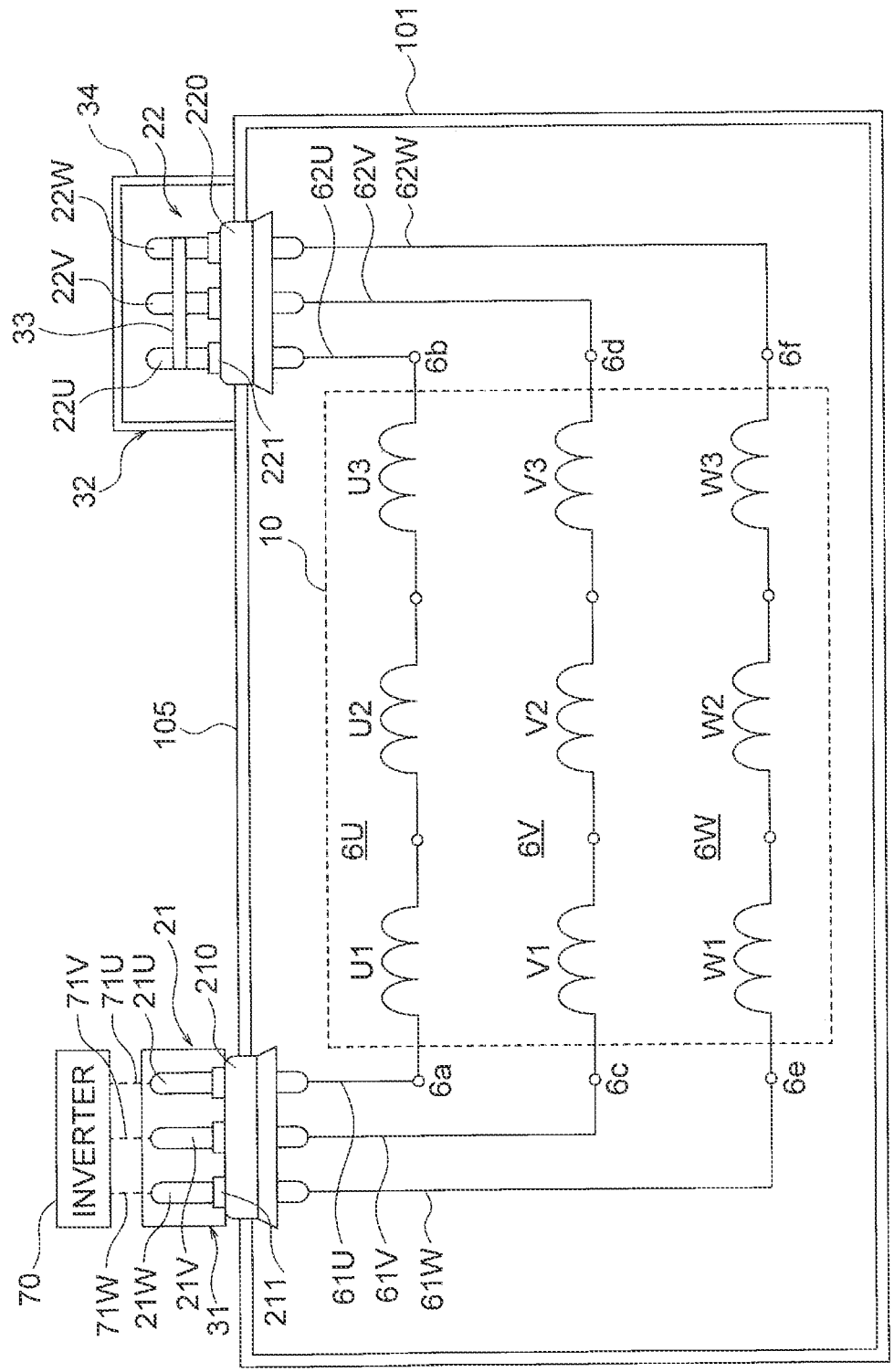
FIG. 3 is a diagram illustrating a manner of connection of the coils of the compressor of FIG. 1.

FIG. 3 is a diagram illustrating a manner of connection of the coils 6U, 6V, and 6W of the motor 10. The coil 6U is formed by serially connecting coil elements U1, U2, and U3 wound around three teeth 52. In FIG. 2 described above, characters U1, U2, and U3 respectively denote the teeth 52 around which the coil elements U1, U2, and U3 are wound. The coil 6U includes a first terminal 6a and a second terminal 6b. The first terminal 6a and the second terminal 6b are open in the motor 10.

The coil 6V is formed by serially connecting coil elements V1, V2, and V3 wound around three teeth 52. In FIG. 2 described above, characters V1, V2, and V3 respectively denote the teeth 52 around which the coil elements V1, V2, and V3 are wound. The coil 6V includes a first terminal 6c and a second terminal 6d. The first terminal 6c and the second terminal 6d are open in the motor 10.

The coil 6W is formed by serially connecting coil elements W1, W2, and W3 wound around three teeth 52. In FIG. 2 described above, characters W1, W2, and W3 respectively denote the teeth 52 around which the coil elements W1, W2, and W3 are wound. The coil 6W includes a first terminal 6e and a second terminal 6f. The first terminal 6e and the second terminal 6f are open in the motor 10.

The coils 6U, 6V, and 6W include the six terminals 6a through 6f in total. When N denotes an integer, the total number of terminals of the coils 6U, 6V, and 6W is represented by 6×N. A case where N is 1 will be described herein. It is noted that N may be 2 or more, and may be, for example, 3 as described later (see FIG. 26).

A lead wire 61U is connected to the first terminal 6a of the coil 6U, and a lead wire 62U is connected to the second terminal 6b of the coil 6U. A lead wire 61V is connected to the first terminal 6c of the coil 6V, and a lead wire 62V is connected to the second terminal 6d of the coil 6V. A lead wire 61W is connected to the first terminal 6e of the coil 6W, and a lead wire 62W is connected to the second terminal 6f of the coil 6W. Each of the lead wires 61U, 62U, 61V, 62V, 61W, and 62W is constituted by an electrically conductive lead.

Figure 4:
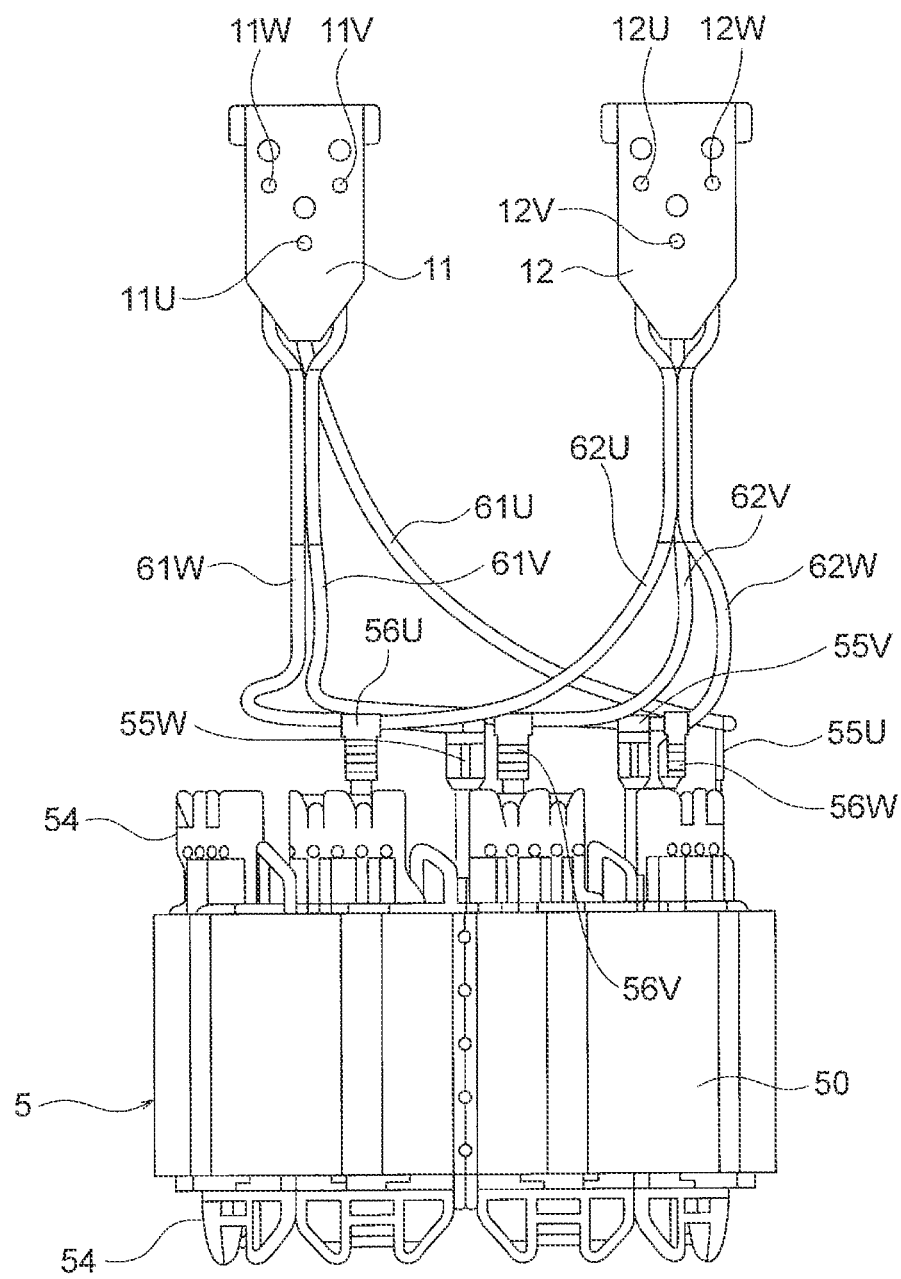
FIG. 4 is a schematic view illustrating the coils, lead wires, and sockets according to the first embodiment.

FIG. 4 is a schematic view illustrating the stator 5 of the motor 10, the lead wires 61 and 62, and sockets 11 and 12. Plugs 55U, 55V, 55W, 56U, 56V, and 56W are provided on the insulating portion 54 of the stator 5.

The plug 55U connects the first terminal 6a (FIG. 3) of the coil 6U to the lead wire 61U, and the plug 56U connects the second terminal 6b (FIG. 3) of the coil 6U to the lead wire 62U. The plug 55V connects the first terminal 6c (FIG. 3) of the coil 6V to the lead wire 61V, and the plug 56V connects the second terminal 6d (FIG. 3) of the coil 6V to the lead wire 62V. The plug 55W connects the first terminal 6e (FIG. 3) of the coil 6W to the lead wire 61W, and the plug 56W connects the second terminal 6f (FIG. 3) of the coil 6W to the lead wire 62W.

The lead wires 61U, 61V, and 61W are connected to the first socket 11. The lead wires 62U, 62V, and 62W are connected to the second socket 12. The sockets 11 and 12 are not shown in FIG. 3 described above.

As illustrated in FIG. 1, the first socket 11 is attached to the first terminal portion 21 mounted on the container top 103. The second socket 12 is attached to the second terminal portion 22 mounted on the container top 103.

An inverter connecting portion 31 attached to lead wires 71U, 71V, and 71C from the inverter 70 is attached to the first terminal portion 21. A connection fixing portion 32 is attached to the second terminal portion 22. The first terminal portion 21 and the second terminal portion 22 will be collectively referred to as terminal portions 21 and 22.

Figure 5A:
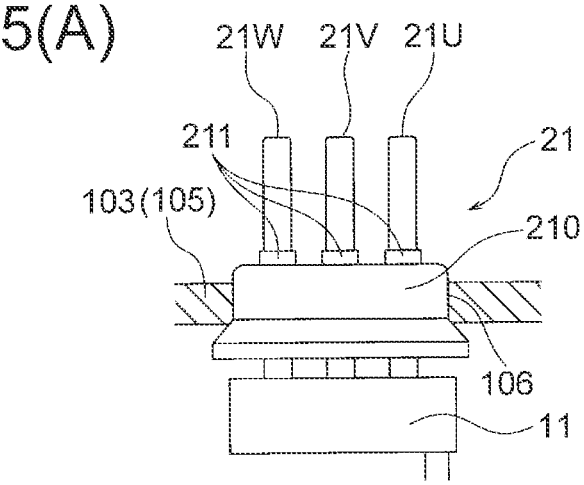
FIGS. 5(A) and 5(B) are respectively a sectional view and a perspective view illustrating a first terminal portion and the socket according to the first embodiment.
Figure 5B:
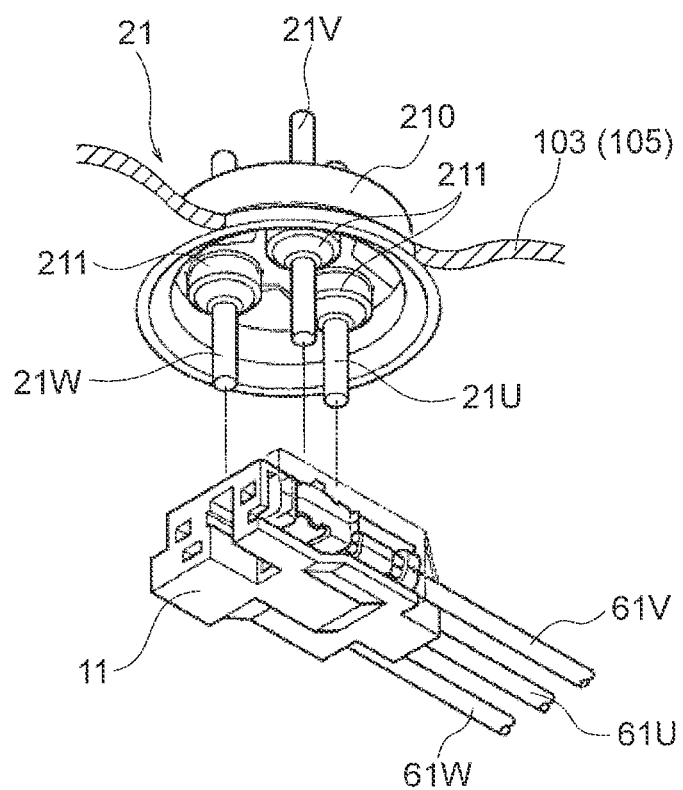

FIG. 5(A) is a sectional view illustrating the first socket 11 and the first terminal portion 21. FIG. 5(B) is a perspective view illustrating the first socket 11 and the first terminal portion 21.

The first terminal portion 21 includes three pins 21U, 21V, and 21W that are conductors, a base member 210 fixed to the container top 103 of the closed container 101, and three insulating portions 211 disposed between the base member 210 and the pins 21U, 21V, and 21W. The insulating portions 211 are made of an insulating body such as glass or silicon rubber. The first terminal portion 21 will also be referred to as a connection terminal portion or a glass terminal.

The base member 210 is made of a metal such as iron, and fitted into an attachment hole 106 formed in a wall portion 105 of the container top 103. The base member 210 has a disk shape in this example, but may have other shapes. The pins 21U, 21V, and 21W pass through holes formed in the base member 210, and extend from the inside to the outside of the closed container 101. The insulating portions 211 are interposed between the pins 21U, 21V, and 21W and the holes.

The first socket 11 has three holes into which the pins 21U, 21V, and 21W are fitted. End portions of the lead wires 61U, 61V, and 61W are fixed to the first socket 11. In the first socket 11, the pins 21U, 21V, and 21W are respectively connected to the lead wires 61U, 61V, and 61W.

Although FIGS. 5(A) and 5(B) illustrate the first terminal portion 21 and the first socket 11, the second terminal portion 22 and the second socket 12 are configured similarly to the first terminal portion 21 and the first socket 11. Specifically, the second terminal portion 22 includes pins 22U, 22V, and 22W, a base member 220, and an insulating portion 221 (FIG. 3).

The number of pins 21U, 21V, and 21W of the first terminal portion 21 is 3N. Similarly, the number of the pins 22U, 22V, and 22W of the second terminal portion 22 is 3N. That is, the total number of pins of the first terminal portion 21 and the second terminal portion 22 is 6N. As described above, N is an integer, and is one in this example, but may be two or more.

As described above, the lead wires 61U, 61V, and 61W are connected to the pins 21U, 21V, and 21W of the first terminal portion 21 via the first socket 11. As illustrated in FIG. 3, the pins 21U, 21V, and 21W of the first terminal portion 21 are connected to the lead wires 71U, 71V, and 71W of the inverter 70 via the inverter connecting portion 31. That is, the first terminals 6a, 6c, and 6e of the coils 6U, 6V, and 6W are electrically connected to the inverter 70.

In contrast, the lead wires 62U, 62V, and 62W are connected to the pins 22U, 22V, and 22W of the second terminal portion 22. The pins 22U, 22V, and 22W of the second terminal portion 22 are electrically connected to one another by a conductor portion 33 in the connection fixing portion 32. That is, the second terminals 6b, 6d, and 6f of the coils 6U, 6V, and 6W are electrically connected to one another.

Figure 6:
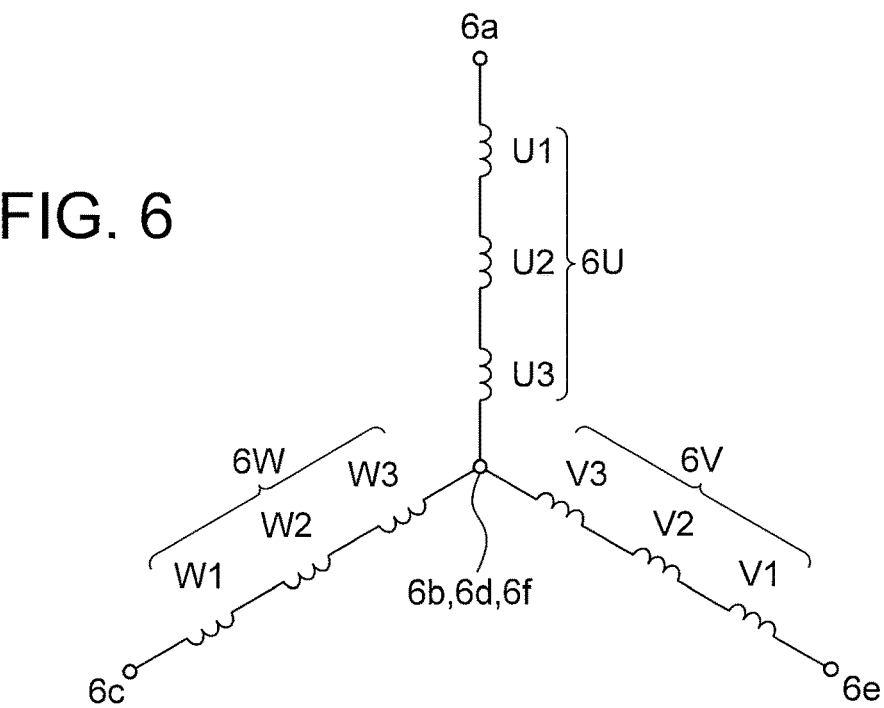
FIG. 6 is a diagram illustrating the connection state of the coils of the compressor of FIG. 1.

FIG. 6 is a diagram illustrating a connection state of the coils 6U, 6V, and 6W of the compressor 100 of FIG. 1. As described above, the second terminals 6b, 6d, and 6f of the coils 6U, 6V, and 6W are electrically connected to one another by the conductor portion 33 of the connection fixing portion 32. Thus, the coils 6U, 6V, and 6W are connected to one another at the second terminals 6b, 6d, and 6f serving as a neutral point. In other words, the coils 6U, 6V and 6W are connected in a Y connection.

A state where the coils 6U, 6V, and 6W in which coil elements of each phase are connected in series are connected in the Y connection as above will be referred to as a serial Y connection.

Figure 7:
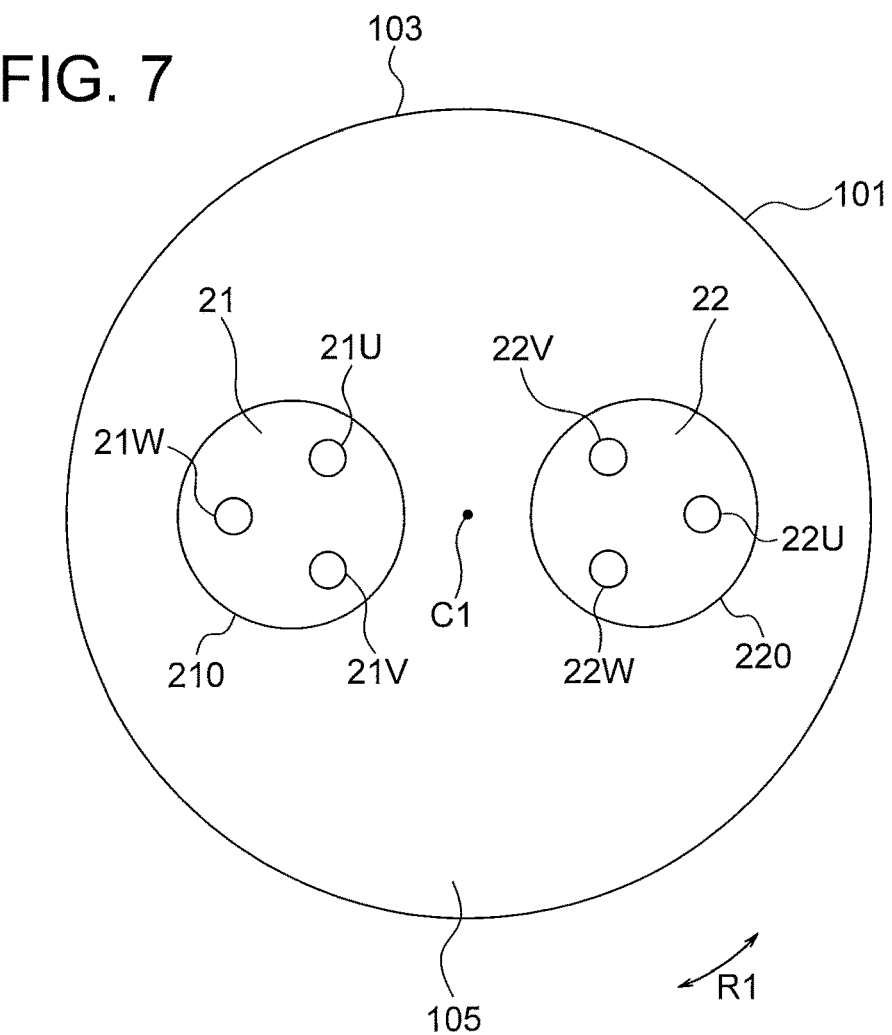
FIG. 7 is a top view illustrating arrangement of the first terminal portion and a second terminal portion according to the first embodiment.

FIG. 7 is a top view illustrating arrangement of the first terminal portion 21 and the second terminal portion 22. The first terminal portion 21 and the second terminal portion 22 are disposed on the outer side of the closed container 101, more specifically, on an upper surface portion of the container top 103. Since the upper surface portion of the container top 103 is flat, the first terminal portion 21 and the second terminal portion 22 can be easily disposed.

Figure 8:
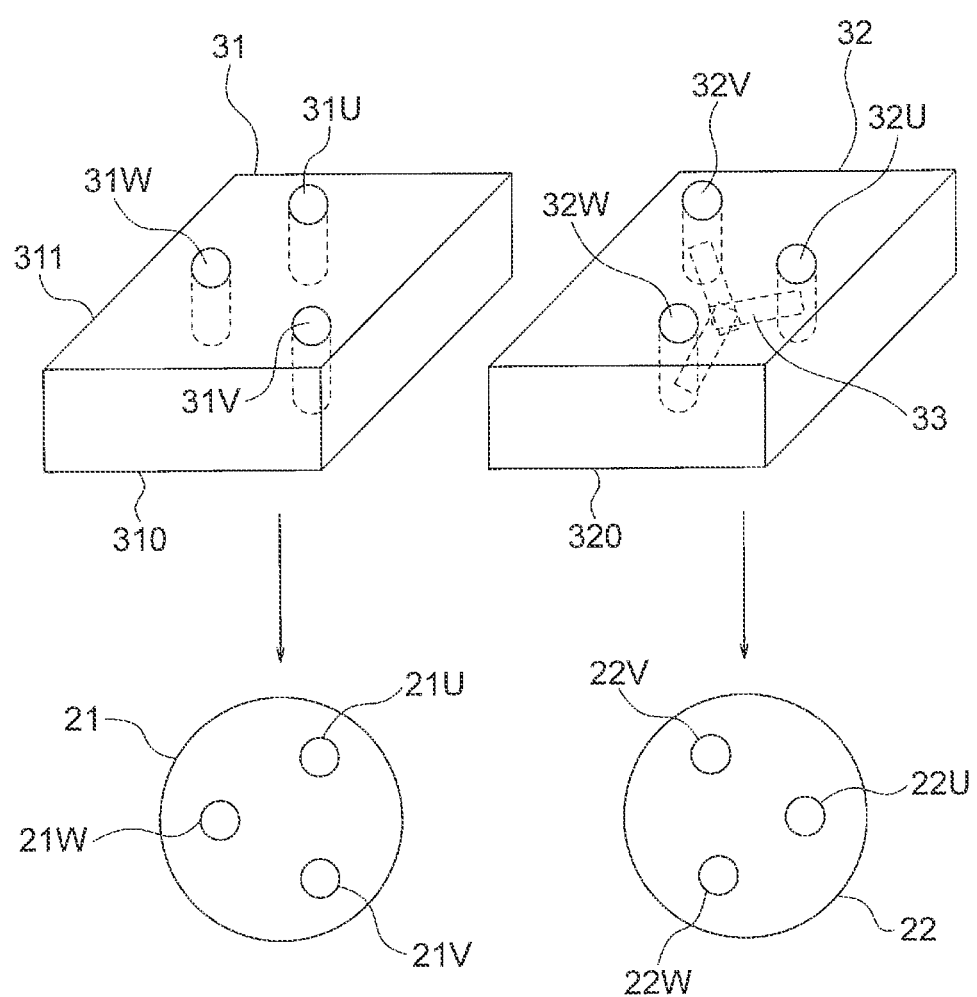
FIG. 8 is a schematic view illustrating an inverter connecting portion, a connection fixing portion, the first terminal portion, and the second terminal portion of the compressor of FIG. 1.

FIG. 8 is a schematic view illustrating the first terminal portion 21, the second terminal portion 22, the inverter connecting portion 31, and the connection fixing portion 32. The inverter connecting portion 31 has holes 31U, 31V, and 31W as fitting portions into which the pins 21U, 21V, and 21W of the first terminal portion 21 are fitted. The holes 31U, 31V, and 31W are formed in, for example, an insulating substrate 310. The substrate 310 is made of, for example, a resin.

The connection fixing portion 32 has holes 32U, 32V, and 32W into which the pins 22U, 22V, and 22W of the second terminal portion 22 are fitted. The holes 32U, 32V, and 32W are formed in, for example, an insulating substrate 320. The holes 32U, 32V, and 32W are connected to one another by the conductor portion 33. The substrate 320 is covered with an insulating cover 34 (FIG. 1).

The substrate 320 is made of, for example, an insulating body such as a resin. The conductor portion 33 is made of a conductor such as a metal. The insulating cover 34 is made of an insulating body such as a resin. The insulating cover 34 may be formed integrally with the substrate 320.

Figure 9:
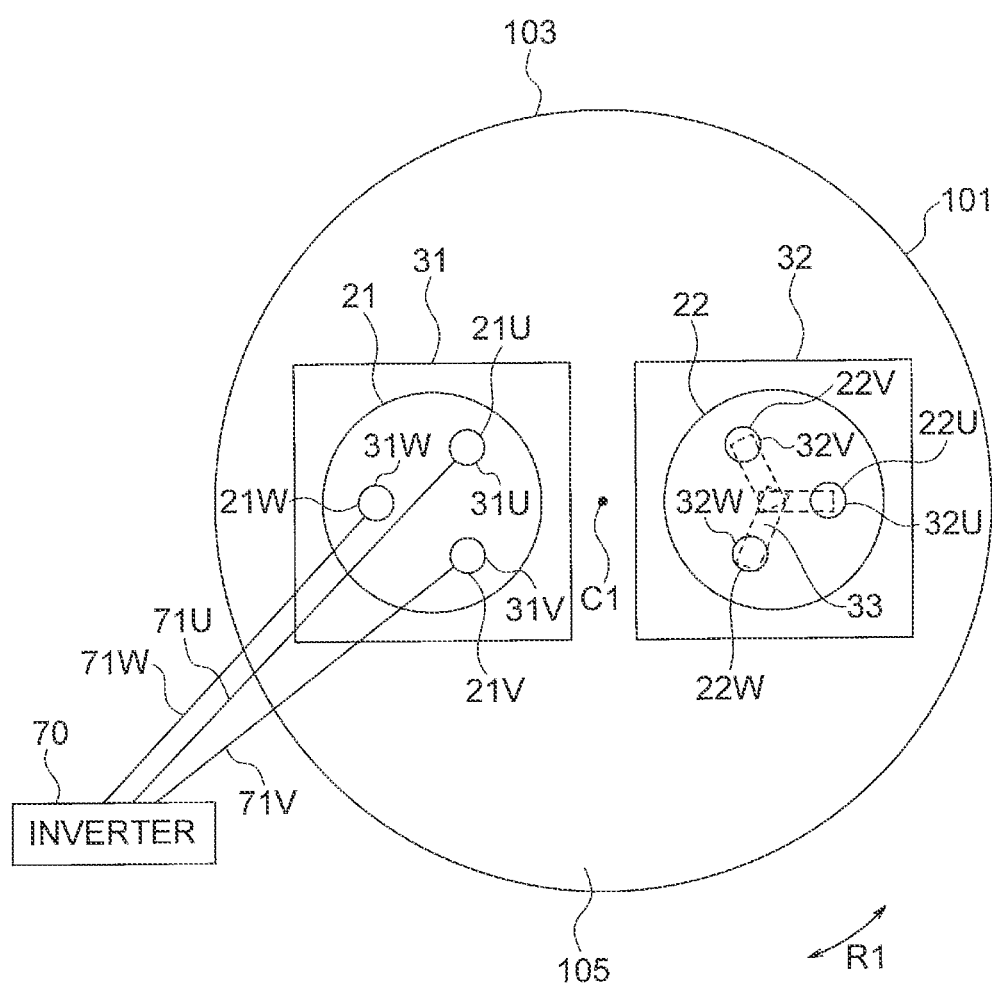
FIG. 9 is a schematic view illustrating the inverter connecting portion, the connection fixing portion, the first terminal portion, the second terminal portion, and an inverter of the compressor of FIG. 1.

FIG. 9 is a schematic view illustrating the first terminal portion 21, the second terminal portion 22, the inverter connecting portion 31, the connection fixing portion 32, and the inverter 70. The inverter connecting portion 31 and the connection fixing portion 32 are attached to the upper surface portion of the container top 103 so that the inverter connecting portion 31 overlaps with the first terminal portion 21 and the connection fixing portion 32 overlaps with the second terminal portion 22.

The pins 21U, 21V, and 21W fitted into the holes 31U, 31V, and 31W of the inverter connecting portion 31 are connected to the lead wires 71U, 71V, and 71W of the inverter 70.

The pins 22U, 22V, and 22W fitted into the holes 32U, 32V, and 32W of the connection fixing portion 32 are electrically connected to one another by the conductor portion 33. Accordingly, as illustrated in FIG. 6, the second terminals 6b, 6d, and 6f are connected to one another, and the Y connection is obtained.

Figure 10:
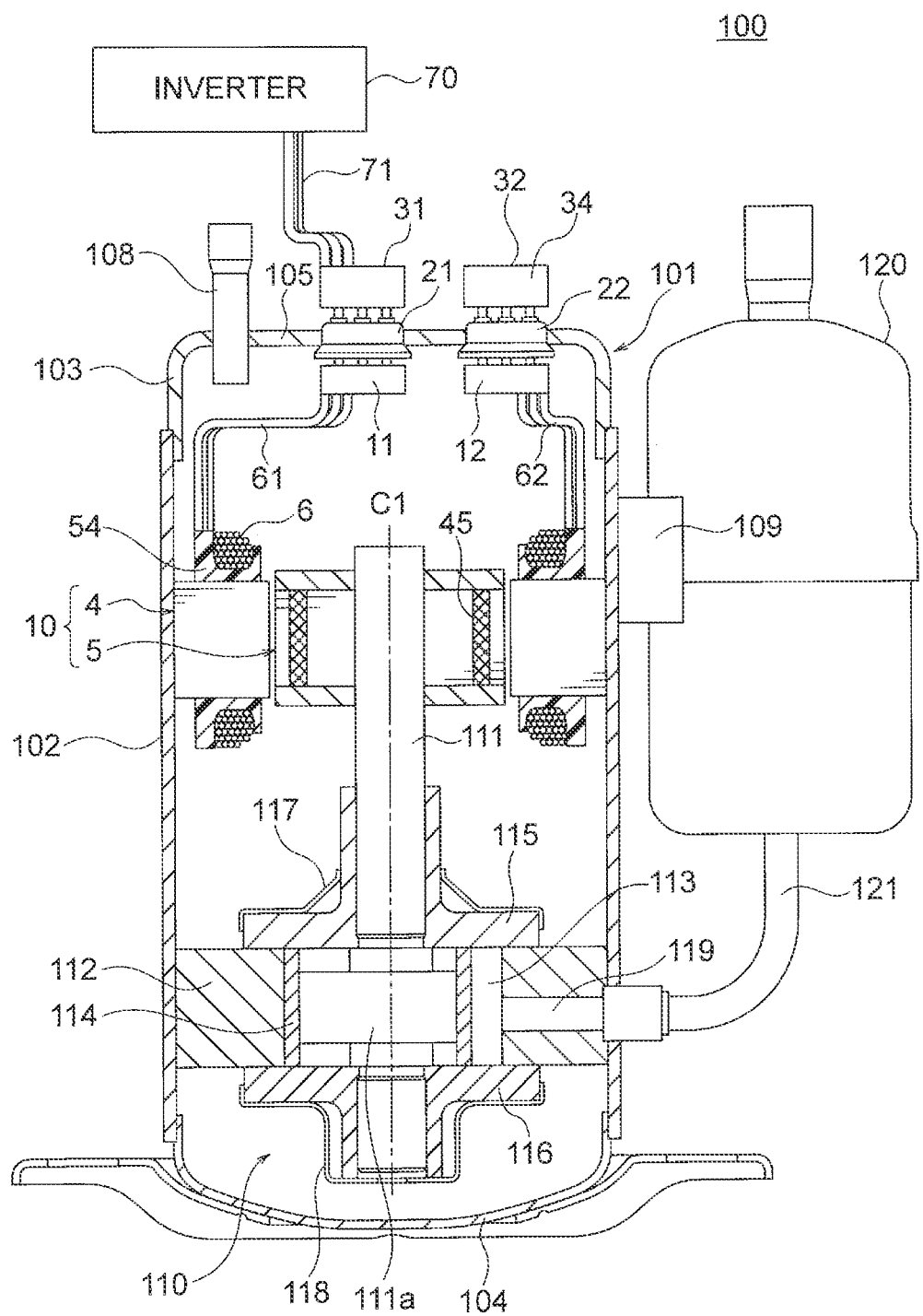
FIG. 10 is a longitudinal sectional view illustrating the compressor of FIG. 1 in such a manner that outer shapes of the inverter connecting portion and the connection fixing portion can be seen.

FIG. 10 is a longitudinal sectional view illustrating the compressor 100 in such a manner that outer shapes of the inverter connecting portion 31 and the connection fixing portion 32 can be seen. As illustrated in FIG. 10, the pins 21U, 21V, and 21W of the first terminal portion 21 are covered with the inverter connecting portion 31, and the pins 22U, 22V, and 22W of the second terminal portion 22 are covered with the connection fixing portion 32. Thus, the pins 21U, 21V, 21W, 22U, 22V, and 22W are not exposed to the outside.

Figure 11:
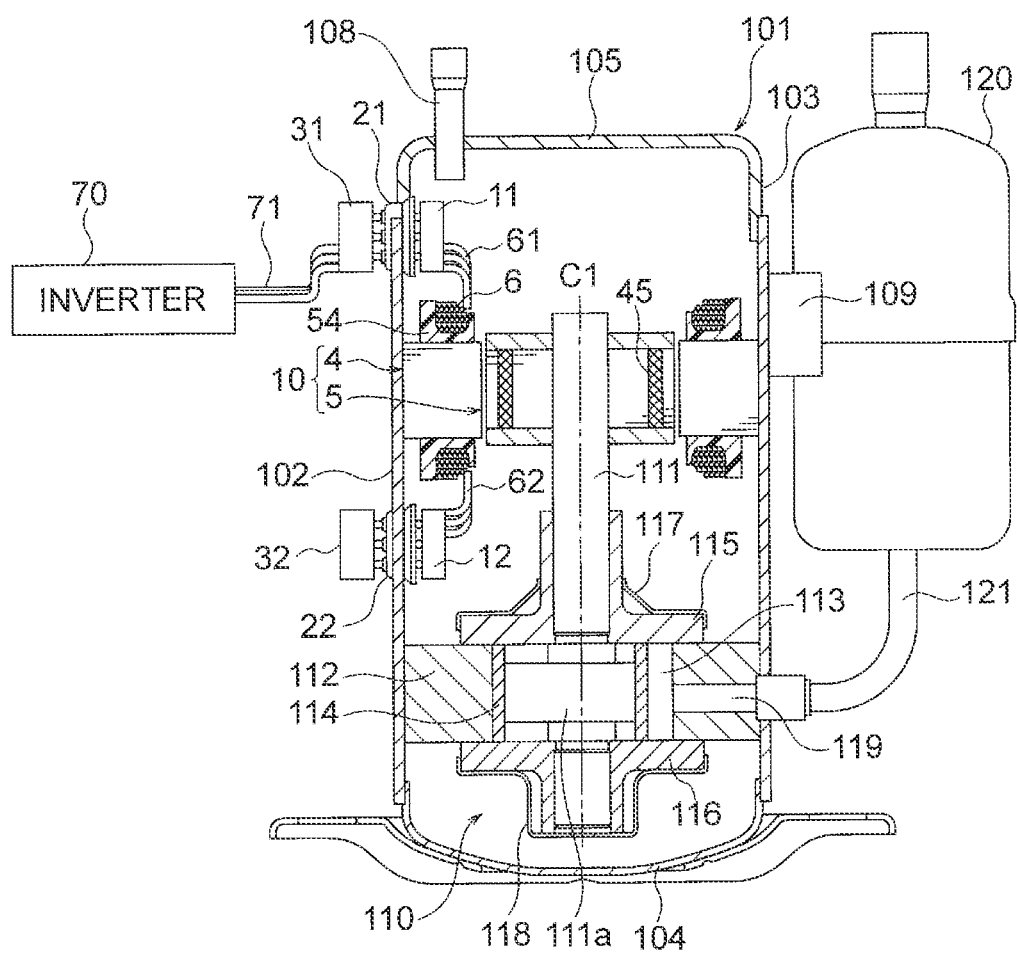
FIG. 11 is a longitudinal sectional view illustrating another configuration example of the compressor of FIG. 1.

In FIGS. 1, 10 and the like, the first terminal portion 21 and the second terminal portion 22 are disposed on the upper surface portion of the container top 103. Alternatively, as illustrated in FIG. 11, the first terminal portion 21 and the second terminal portion 22 may be disposed on a side surface portion of the closed container 101, that is, the outer periphery of the shell 102.

Figure 12:
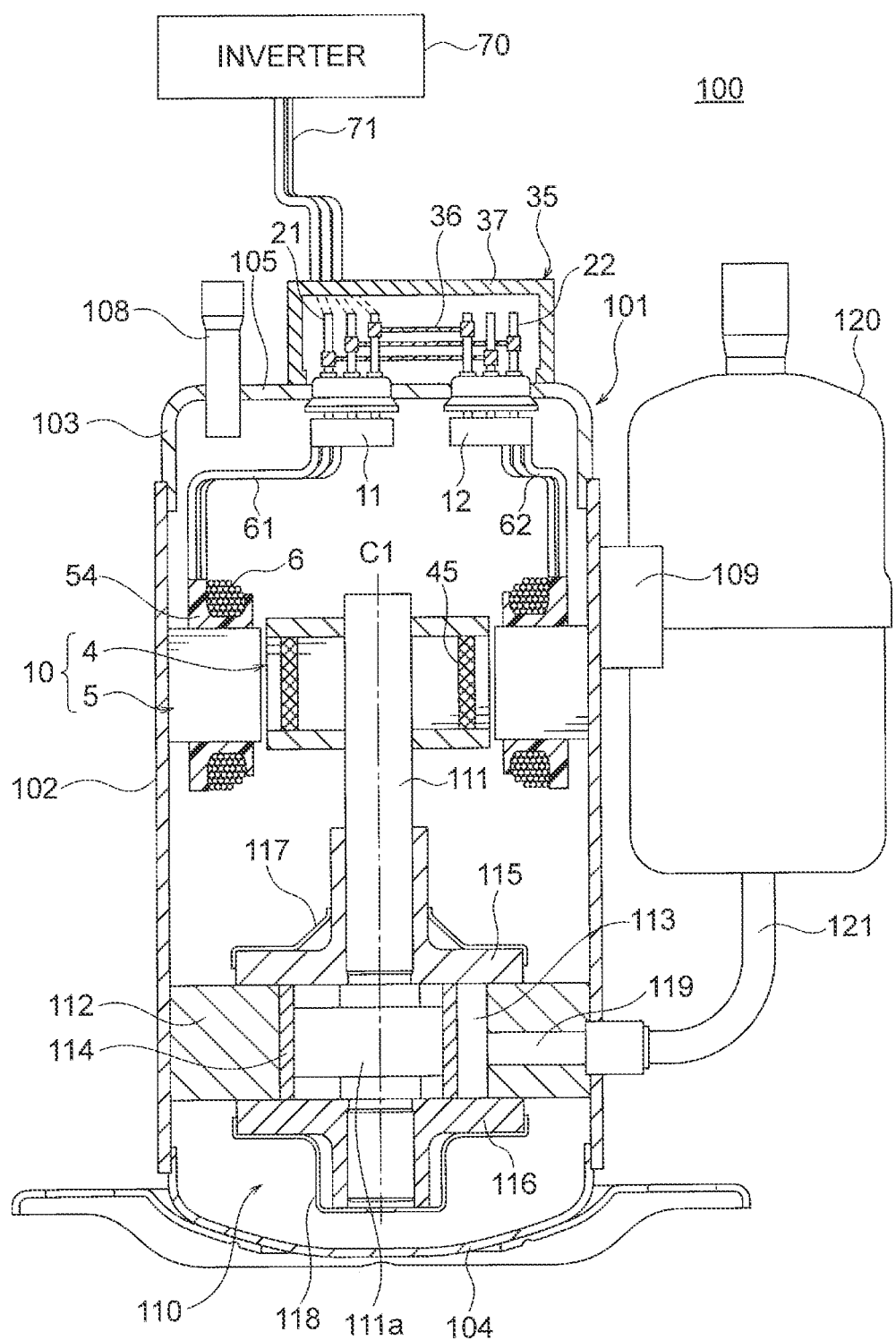
FIG. 12 is a longitudinal sectional view illustrating the compressor according to the first embodiment in which the connection state of the coils is fixed to a delta connection.

FIG. 12 is a longitudinal sectional view illustrating the compressor 100 in which the connection state of the coils 6U, 6V, and 6W is fixed to a delta connection. In FIG. 12, the compressor 100 includes a connection fixing portion 35 instead of the inverter connecting portion 31 and the connection fixing portion 32 (see FIG. 1 and the like). The connection fixing portion 35 is attached to both the first terminal portion 21 and the second terminal portion 22.

Figure 13:
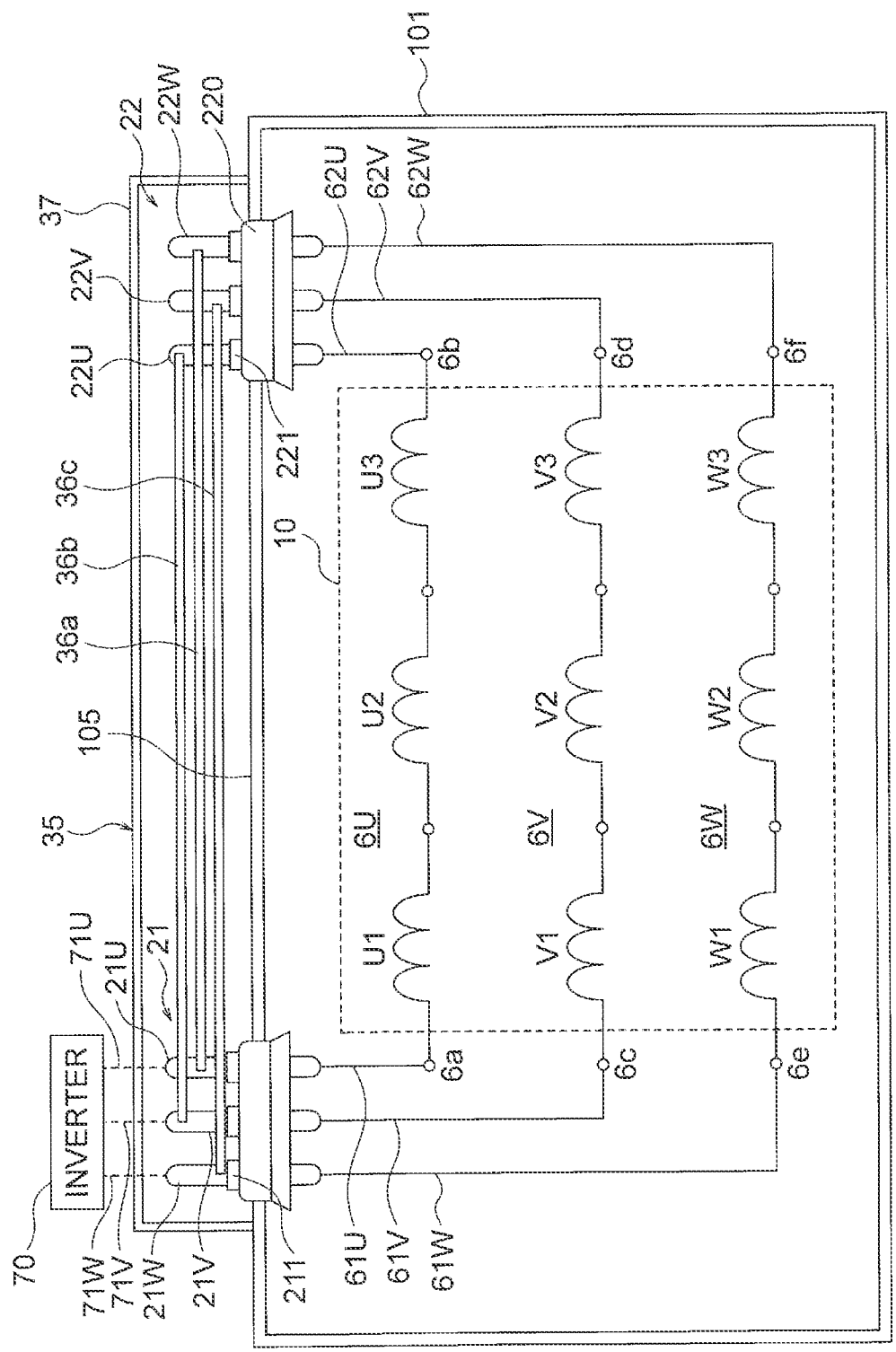
FIG. 13 is a diagram illustrating a manner of connection of the coils of the compressor of FIG. 12.

FIG. 13 is a diagram illustrating a manner of connection of the coils 6U, 6V, and 6W of the compressor 100 of FIG. 12. The connection fixing portion 35 includes a conductor portion 36a connecting the pin 21U and the pin 22W to each other, a conductor portion 36b connecting the pin 21V and the pin 22U to each other, and a conductor portion 36c connecting the pin 21W and the pin 22V to each other. Each of the conductor portions 36a, 36b, and 36c is made of, for example, a conductive body such as copper.

Accordingly, the first terminal 6a of the coil 6U is connected to the second terminal 6f of the coil 6W. The first terminal 6c of the coil 6V is connected to the second terminal 6b of the coil 6U. The first terminal 6e of the coil 6W is connected to the second terminal 6d of the coil 6V.

Figure 14:
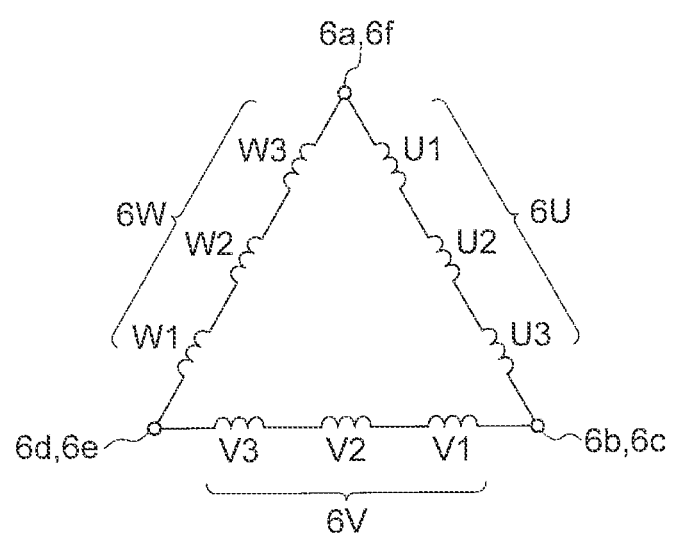
FIG. 14 is a diagram illustrating the connection state of the coils of the compressor of FIG. 12.

FIG. 14 is a diagram illustrating a connection state of the coils 6U, 6V, and 6W of the compressor 100 of FIG. 12. As described above, the first terminal 6a of the coil 6U is connected to the second terminal 6f of the coil 6W, the first terminal 6c of the coil 6V is connected to the second terminal 6b of the coil 6U, and the first terminal 6e of the coil 6W is connected to the second terminal 6d of the coil 6V. Thus, the connection state of the coils 6U, 6V, and 6W is the delta connection.

A state where the coils 6U, 6V, and 6W in which coil elements of each phase are connected in series are connected in the delta connection as above will be referred to as a serial delta connection.

Figure 15:
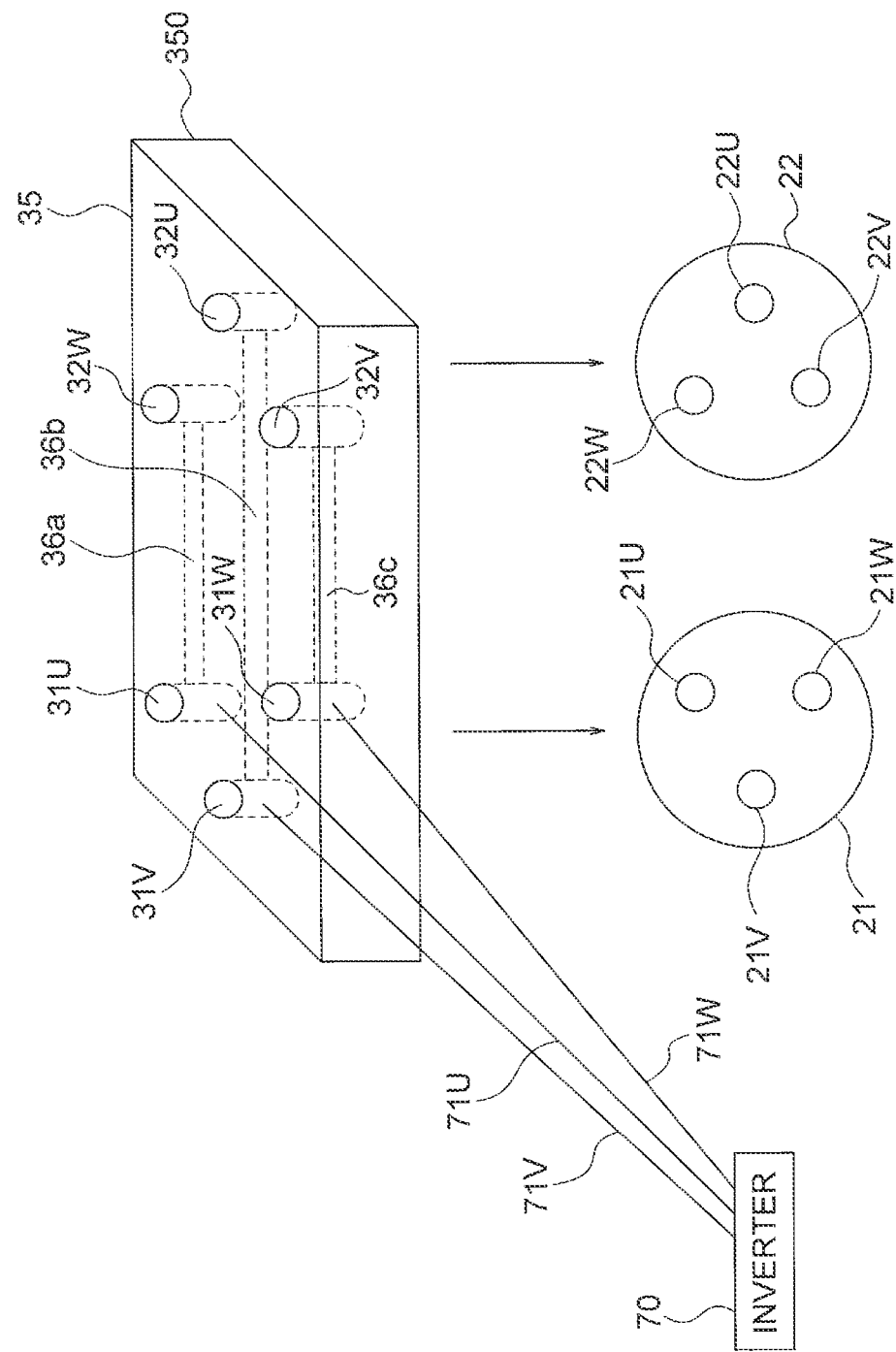
FIG. 15 is a schematic view illustrating a connection fixing portion, the first terminal portion, the second terminal portion, and the inverter of the compressor of FIG. 12.

FIG. 15 is a schematic view illustrating the first terminal portion 21, the second terminal portion 22, and the connection fixing portion 35. The connection fixing portion 35 has holes 31U, 31V, and 31W serving as fitting portions (first fitting portions) into which the pins 21U, 21V, and 21W of the first terminal portion 21 are fitted, and holes 32U, 32V, and 32W serving as fitting portions (second fitting portions) into which the pins 22U, 22V, and 22W of the second terminal portion 22 are fitted. The holes 31U, 31V, 31W, 32U, 32V, and 32W are formed in, for example, an insulating substrate 350.

The hole 31U and the hole 32W are connected to each other via the conductor portion 36a. The hole 31V and the hole 32U are connected to each other via the conductor portion 36b. The hole 31W and the hole 32V are connected to each other via the conductor portion 36c. The conductor portions 36a, 36b, and 36c are formed in the substrate 350. The substrate 350 is covered with an insulating cover 37 (FIG. 12).

The substrate 350 is made of, for example, an insulating body such as a resin. Each of the conductor portions 36a, 36b, and 36c is made of a conductive body such as a metal. The insulating cover 37 is made of an insulating body such as a resin. The insulating cover 37 may be formed integrally with the substrate 350.

Figure 16:
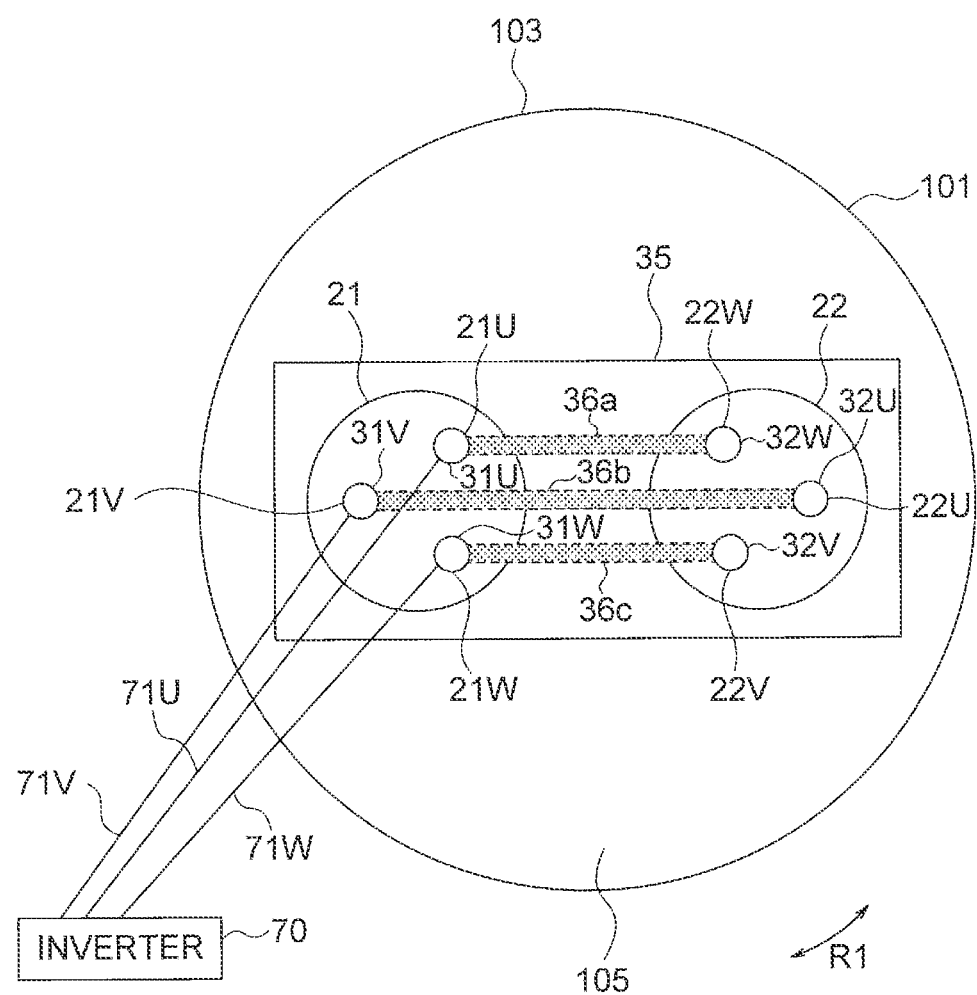
FIG. 16 is a schematic view illustrating the connection fixing portion, the first terminal portion, the second terminal portion, and the inverter of the compressor of FIG. 12.

FIG. 16 is a schematic view illustrating the first terminal portion 21, the second terminal portion 22, the connection fixing portion 35, and the inverter 70. The connection fixing portion 35 is attached to the upper surface portion of the container top 103 so that the connection fixing portion 35 overlaps with the first terminal portion 21 and the second terminal portion 22.

The pins 21U, 21V, and 21W fitted into the holes 31U, 31V, and 31W of the connection fixing portion 35 are respectively connected to the lead wires 71U, 71V, and 71W of the inverter 70.

Thus, the first terminal 6a of the coil 6U and the second terminal 6f of the coil 6W (FIG. 13) are connected to the lead wire 71U. The first terminal 6c of the coil 6V and the second terminal 6b of the coil 6U (FIG. 13) are connected to the lead wire 71V. The first terminal 6e of the coil 6W and the second terminal 6d of the coil 6V (FIG. 13) are connected to the lead wire 71W.

Figure 17:
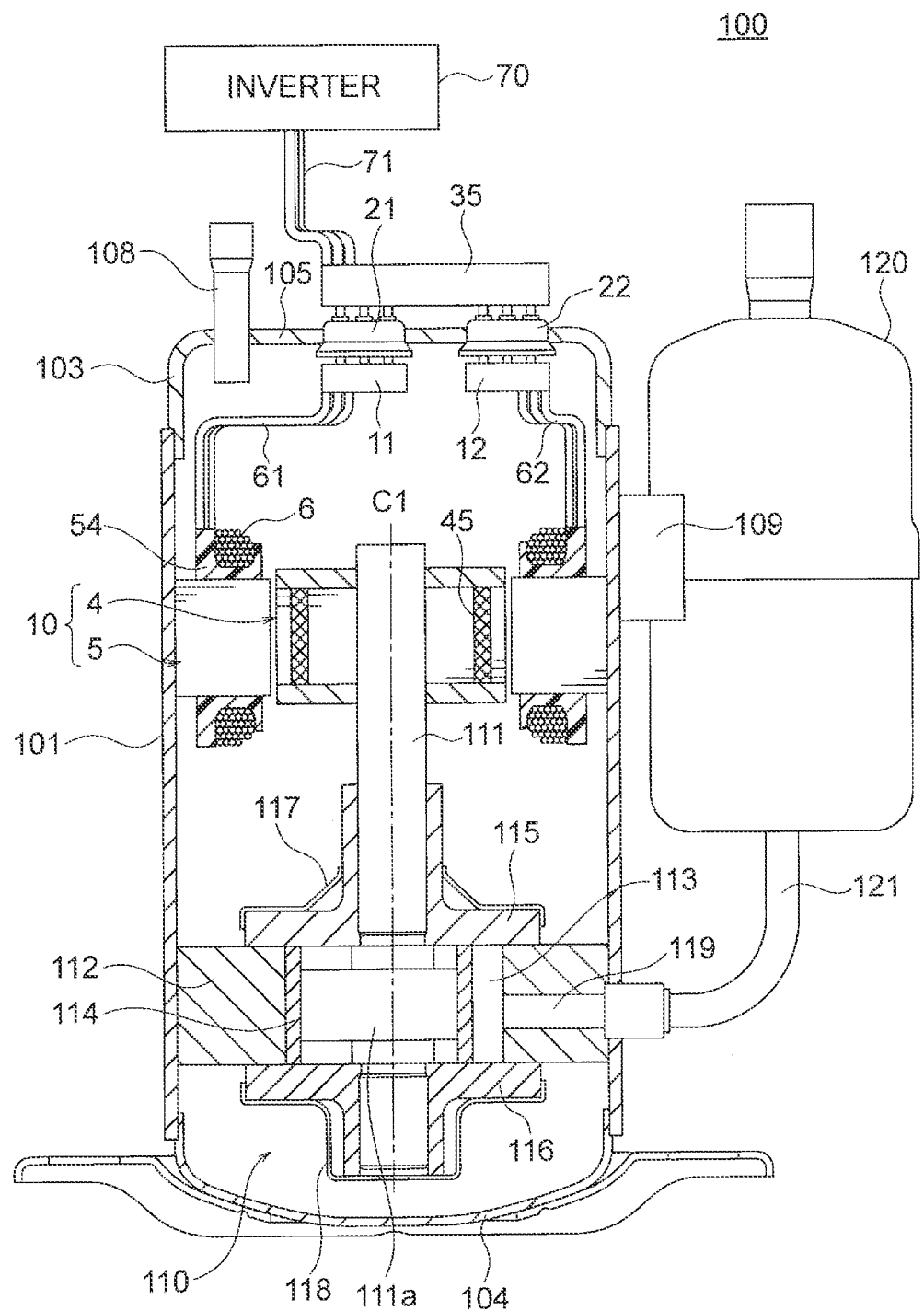
FIG. 17 is a longitudinal sectional view illustrating the compressor of FIG. 12 in such a manner that an outer shape of the connection fixing portion can be seen.

FIG. 17 is a longitudinal sectional view illustrating the compressor 100 in such a manner that an outer shape of the connection fixing portion 35 can be seen. As illustrated in FIG. 17, the pins 21U, 21V, and 21W of the first terminal portion 21 and the pins 22U, 22V, and 22W of the second terminal portion 22 are covered with the connection fixing portion 35. Thus, the pins 21U, 21V, 21W, 22U, 22V, and 22W are not exposed to the outside.

Figure 18:
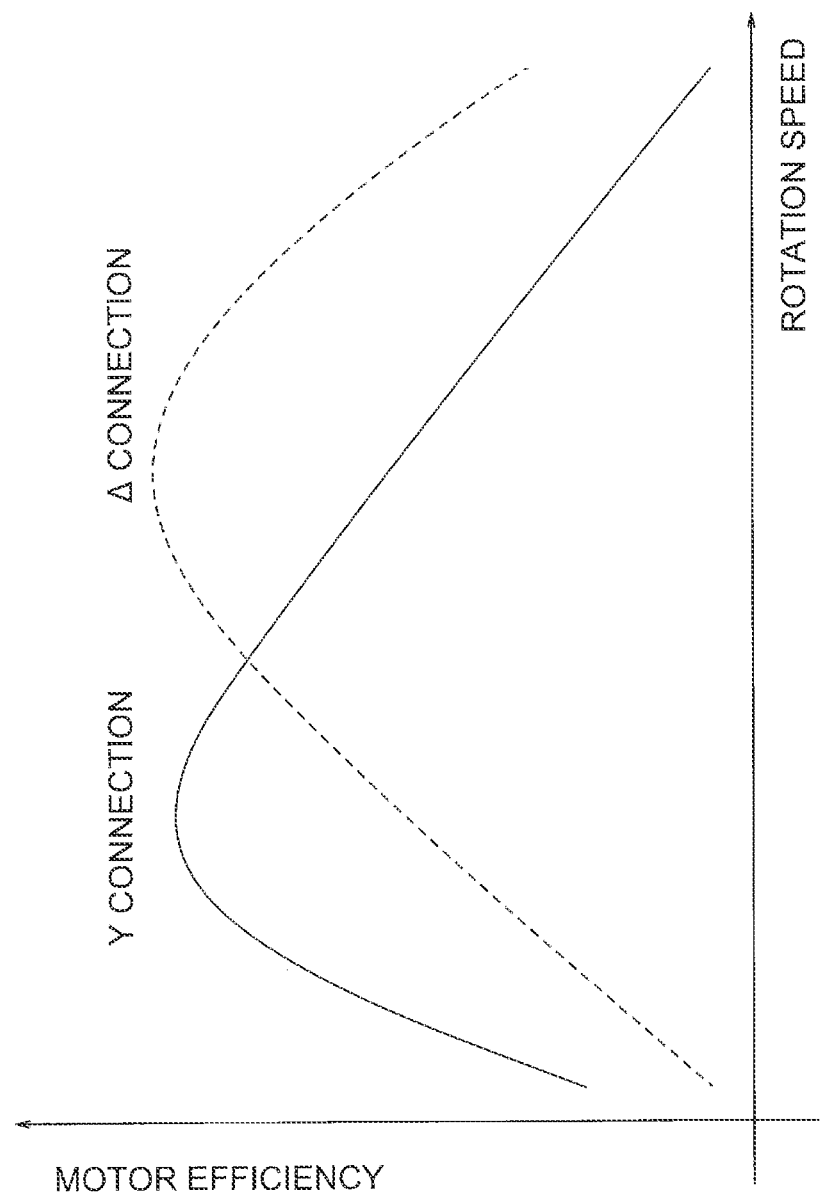
FIG. 18 is a graph showing a relationship between a rotation speed and a motor efficiency of the motor according to the first embodiment for each of the Y connection and the delta connection.

FIG. 18 is a graph showing a relationship between a rotation speed and a motor efficiency of the motor 10 for each of the Y connection and the delta connection. The motor 10 is controlled by the inverter 70 using pulse width modulation (PWM) control.

An output voltage of the inverter 70 is equal to the sum of an induced voltage generated when magnetic fluxes of the permanent magnets 45 are interlinked with the coils 6 of the stator 5 during rotation of the rotor 4, and a voltage generated by resistance and inductance of the coils 6. When the output voltage of the inverter 70 exceeds an inverter maximum output voltage, field-weakening control is performed, and the motor efficiency decreases accordingly.

A comparison between the Y connection and the delta connection shows that an inter-terminal voltage of the coils 6 in the delta connection is $1/\sqrt{3}$ of an inter-terminal voltage of the coils 6 in the Y connection.

For the same load torque, an inverter current in the Y connection is $1/\sqrt{3}$ of an inverter current in the delta connection. As the inverter current decreases, a conduction loss of an inverter circuit decreases, and the motor efficiency increases. An iron loss due to current ripple is smaller in the Y connection than that in the delta connection.

The motor efficiently in the Y connection is higher than that in the delta connection as above. However, in a high-rotation speed range, the output voltage of the inverter 70 reaches the inverter maximum output voltage and field-weakening control is performed. Thus, the Y connection in which the inter-terminal voltage is high is disadvantageous.

For this reason, as shown in FIG. 18, the Y connection provides a higher motor efficiency in a low-rotation speed range, whereas the delta connection provides a higher motor efficiency in a high-rotation speed range.

In FIG. 18, both a curve showing the motor efficiency in the Y connection and a curve showing the motor efficiency in the delta connection show decreases after peaks. This is caused by the start of field-weakening control. Since the induced voltage increases as the rotation speed increases, the motor efficiency decreases due to a weakening current, a conduction loss of the inverter 70, and a copper loss of the coils 6.

For this reason, in a case where the maximum rotation speed of the compressor 100 is a low rotation speed, the connection state of the coils 6U, 6V, and 6W is set to the Y connection. In a case where the maximum rotation speed of the compressor 100 is a high rotation speed, the connection state of the coils 6U, 6V, and 6W is set to the delta connection. However, in general, after the motor 10 is incorporated in the compressor 100, it is difficult to change the connection state of the coils 6U, 6V, and 6W.

Figure 19:
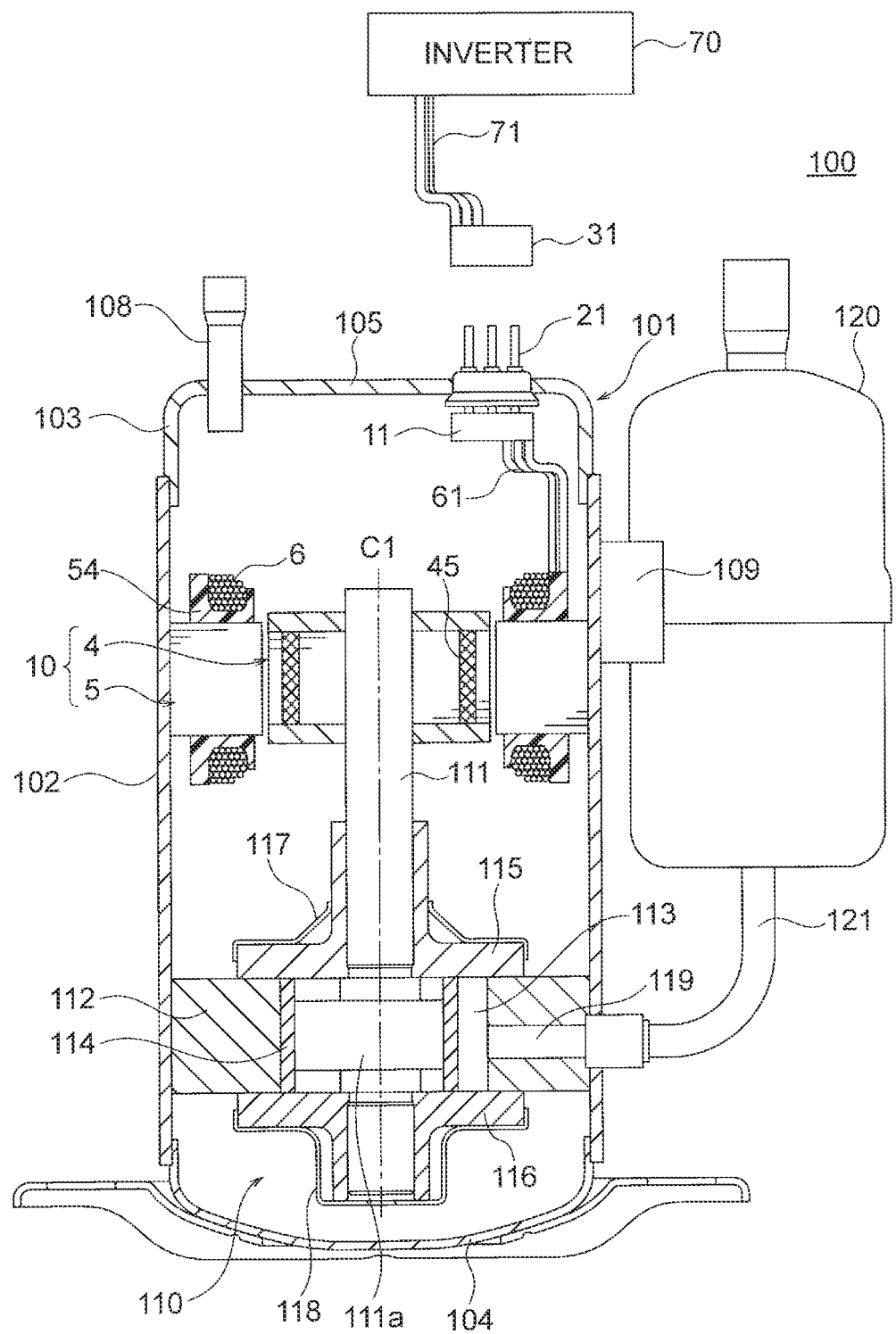
FIG. 19 is a longitudinal sectional view illustrating a compressor according to a comparative example.

FIG. 19 is a longitudinal sectional view illustrating a compressor 100 according to a comparative example. In the comparative example, a connection state of coils 6U, 6V, and 6W of a motor 10 is fixed to the Y connection in the motor 10.

Figure 20:
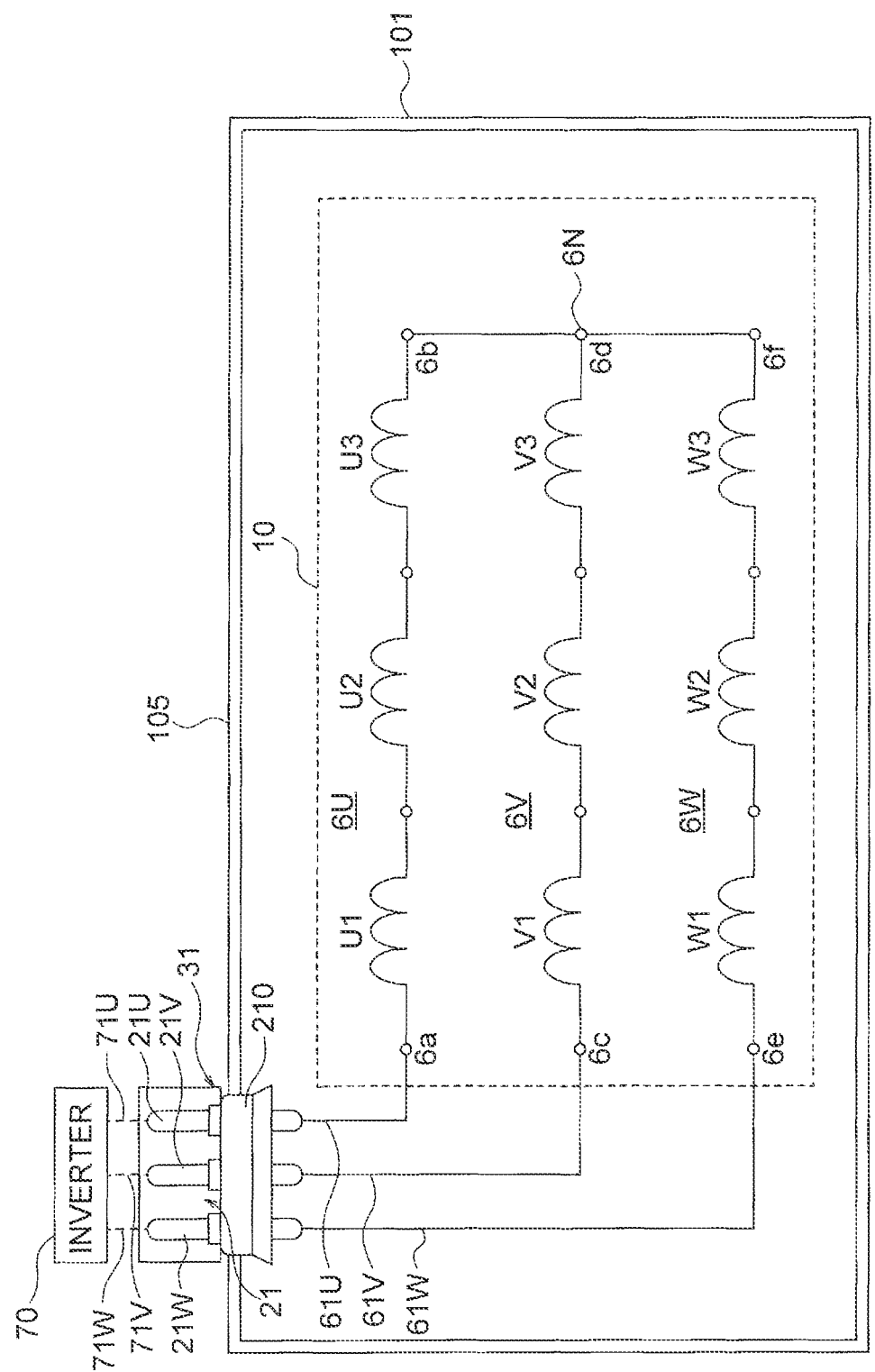
FIG. 20 is a diagram illustrating a manner of connection of coils of the compressor of FIG. 19.

FIG. 20 is a diagram illustrating a manner of connection of the coils 6U, 6V, and 6W of the compressor 100 of the comparative example. First terminals 6a, 6c, and 6e of the coils 6U, 6V, and 6W are connected to lead wires 61U, 61V, and 61W, and connected to an inverter connecting portion 31 via a first socket 11 (FIG. 19).

Second terminals 6b, 6d, and 6f of the coils 6U, 6V, and 6W are connected to one another in the motor 10 and constitute a neutral point 6N. Since the connection state of 6U, 6V, and 6W is the Y connection, the motor 10 provides a high motor efficiency in the low-rotation speed range.

However, the connection state of the coils 6U, 6V, and 6W is fixed in the motor 10. Thus, in a case where the maximum rotation speed of the compressor 100 is changed to a high rotation speed after the motor 10 is incorporated in the compressor 100, it is difficult to change the connection state of the coils 6U, 6V, and 6W to the delta connection.

If the connection state of the coils 6U, 6V, and 6W is fixed to the motor 10 as above, it is necessary to manufacture the compressors 100 including the motors 10 having different characteristics for the maximum rotation speeds of the compressors 100. Accordingly, the number of types of the compressors 100 increases. In addition, if the common motor 10 is used for the compressors 100 having different maximum rotation speeds, the motor efficiency of each compressor 100 decreases, and an output range of each compressors 100 decreases.

In contrast, in the first embodiment, the terminals 6a through 6f of the coils 6U, 6V, and 6W are open in the motor 10, and the connection state of the coils 6U, 6V, and 6W is fixed to the Y connection or the delta connection by the connection fixing portion 32 (FIG. 3) or the connection fixing portion 35 (FIG. 13). Thus, even after the motor 10 is incorporated in the compressor 100, the connection state of the coils 6U, 6V, and 6W can be changed from outside the compressor 100.

That is, electrical characteristics of the motor 10 can be changed by replacing the connection fixing portion 32 (FIG. 3) and the connection fixing portion 35 (FIG. 13) of the compressor 100 with each other. Accordingly, it becomes possible to flexibly cope with various specifications of the compressor 100.

Advantages of Embodiment

As described above, in the first embodiment, the compressor 100 includes the coils 6U, 6V, and 6W having the 6N terminals 6a through 6f, the terminal portions 21 and 22 electrically connected to the terminals 6a through 6f and protruding outside the closed container 101, the conductor portion 33 (36a, 36b, and 36c) attached to at least a part of the terminal portions 21 and 22 to fix the connection state of the coils 6U, 6V, and 6W, and the insulating cover 34 (37) covering at least the conductor portion 33 (36a, 36b, and 36c). Thus, the connection state of the coils 6U, 6V, and 6W can be changed after the motor 10 is incorporated in the compressor 10, and an optimum connection state can be obtained depending on specifications of the compressor 100. As a result, an operation efficiency of the compressor 100 can be enhanced.

Since the first terminal portion 21 electrically connected to at least three of the 6N terminals of the coils 6U, 6V, and 6W is provided, the inverter 70 can be electrically connected to the coils 6U, 6V, and 6W outside the compressor 100.

In the case where the connection state of the coils 6U, 6V, and 6W is fixed to the Y connection by the conductor portion 33 of the connection fixing portion 32, the high motor efficiency can be obtained in the low-rotation speed range.

In the case where the connection state of the coils 6U, 6V, and 6W is fixed to the delta connection by the conductor portions 36a, 36b, and 36c of the connection fixing portion 35, the high motor efficiency can be obtained in the high-rotation speed range.

The second terminal portion 22 includes the base member 220 fixed to the wall portion 105 of the closed container 101 and the pins 22U, 22V, and 22W attached to the base member 220 and extending from the inside to the outside of the closed container 101. Thus, the connection state of the coils 6U, 6V, and 6W can be changed by using the pins 22U, 22V, and 22W outside the closed container 101.

Since the connection fixing portion 32 has the holes 32U, 32V, and 32W into which the pins 22U, 22V, and 22W of the second terminal portion 22 are fitted, the Y connection of the coils 6U, 6V, and 6W can be obtained by using the conductor portion 33.

Since the connection fixing portion 35 has the holes 31U, 31V, and 31W into which the pins 21U, 21V, and 21W of the first terminal portion 21 are fitted, and the holes 32U, 32V, and 32W into which the pins 22U, 22V, and 22W of the second terminal portion 22 are fitted, the delta connection of the coils 6U, 6V, and 6W can be obtained by using the conductor portions 36a, 36b, and 36c.

Since the coils 6U, 6V, and 6W include two or more coil elements of each phase and the two or more coil elements are connected in series in the motor 10, a higher motor efficiency can be obtained in the low-rotation speed range, as compared to the case where the coils elements of each phase are connected in parallel.

Since the first terminal portion 21 and the second terminal portion 22 are attached to the upper surface portion of the closed container 101, the first terminal portion 21 and the second terminal portion 22 can be placed on a flat surface, and thus the manufacturing of the compressor 100 is facilitated.

Since the lead wires 61U, 61V, 61W, 62U, 62V, and 62W are connected to the terminals 6a through 6f of the coils 6U, 6V, and 6W, and these lead wires are connected to the first terminal portion 21 and the second terminal portion 22 via the sockets 11 and 12, the connecting portions of the terminals 6a through 6f of the coils 6U, 6V, and 6W can be led to the outside of the closed container 101.

Second Embodiment

Figure 21:
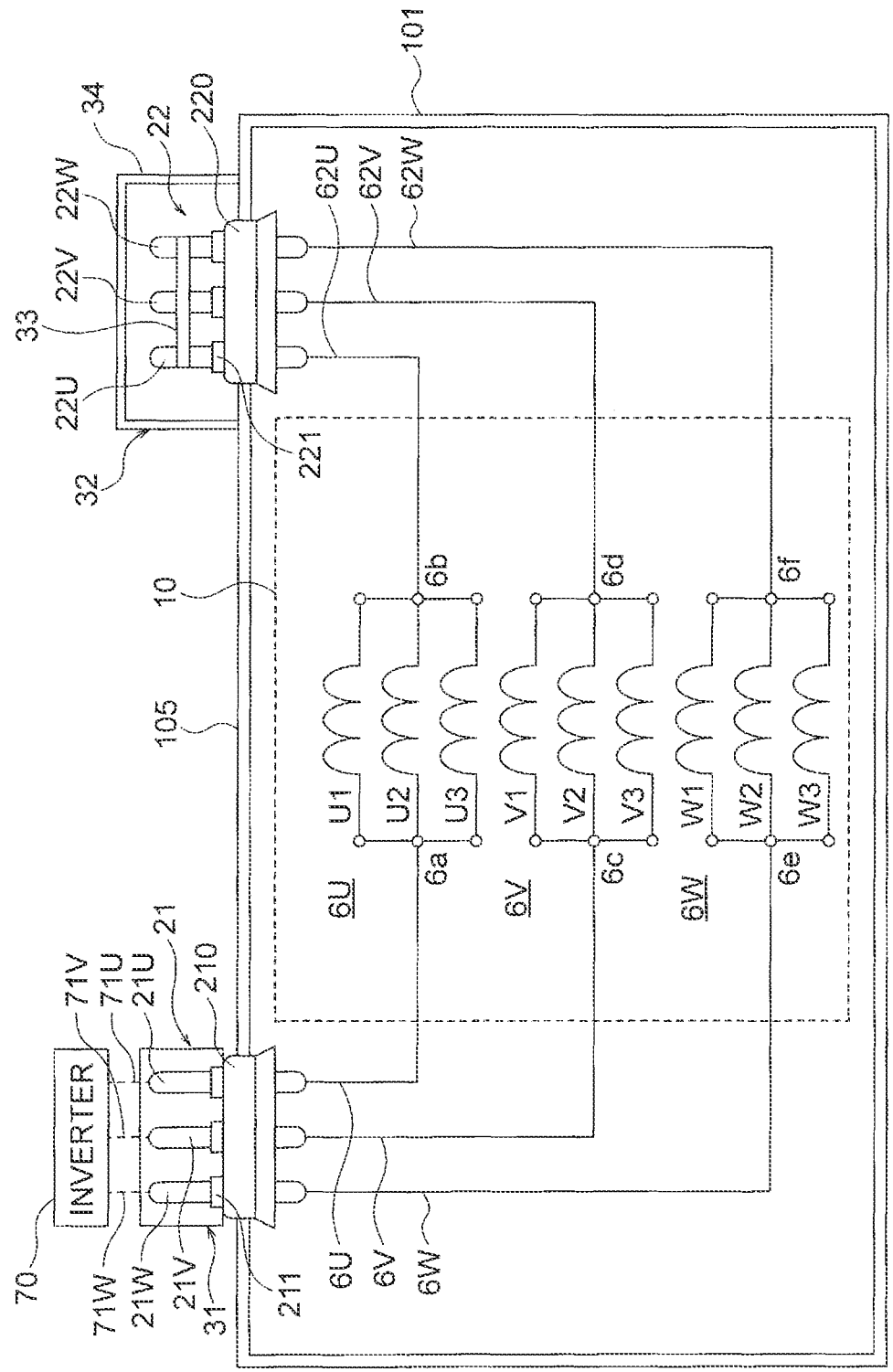
FIG. 21 is a diagram illustrating a manner of connection of coils of a compressor according to a second embodiment in which a connection state of coils is fixed to the Y connection.

Next, a second embodiment will be described. FIG. 21 is a diagram illustrating a manner of connection of coils 6U, 6V, and 6W of a compressor 100 according to a second embodiment in which a connection state is fixed to the Y connection.

In the first embodiment described above, the coil elements U1, U2, and U3 of the coil 6U are connected in series, the coil elements V1, V2, and V3 of the coil 6V are connected in series, and the coil elements W1, W2, and W3 of the coil 6W are connected in series.

In contrast, in the second embodiment, coil elements U1, U2, and U3 of a coil 6U are connected in parallel, coil elements V1, V2, and V3 of a coil 6V are connected in parallel, and coil elements W1, W2, and W3 of a coil 6W are connected in parallel.

In FIG. 21, first terminals 6a, 6c, and 6e of the coils 6U, 6V, and 6W are connected to lead wires 61U, 61V, and 61W, and connected to a first terminal portion 21. Second terminals 6b, 6d, and 6f of the coils 6U, 6V, and 6W are connected to lead wires 62U, 62V, and 62W, and connected to a second terminal portion 22.

An inverter connecting portion 31 is attached to the first terminal portion 21, and a connection fixing portion 32 is attached to the second terminal portion 22. As described in the first embodiment, the inverter connecting portion 31 is connected to the inverter 70. The connection fixing portion 32 includes pins 22U, 22V, and 22W and a conductor portion 33 connecting these pins as described in the first embodiment.

Figure 22:
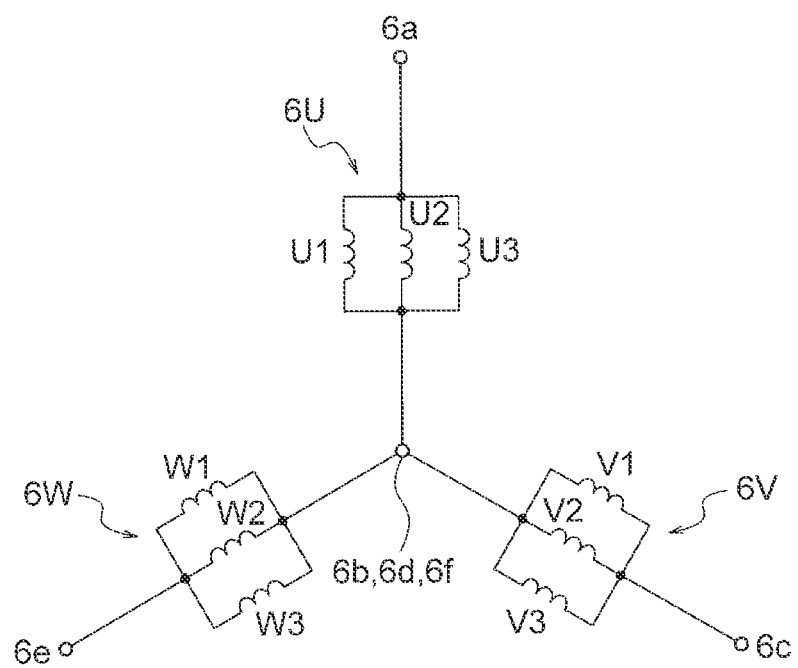
FIG. 22 is a diagram illustrating the connection state of the coils of the compressor of FIG. 21.

FIG. 22 is a diagram illustrating a manner of connection of the coils 6U, 6V, and 6W of the compressor 100 of FIG. 21. As described above, the second terminals 6b, 6d, and 6f of the coils 6U, 6V, and 6W are electrically connected to one another by the connection fixing portion 32. Thus, the coils 6U, 6V, and 6W are connected to one another at the second terminals 6b, 6d, and 6f serving as a neutral point. In other words, the coils 6U, 6V and 6W are connected in the Y connection.

A state where the coils 6U, 6V, and 6W in which coil elements of each phase are connected in parallel are connected in the Y connection as above will be referred to as a parallel Y connection.

Figure 23:
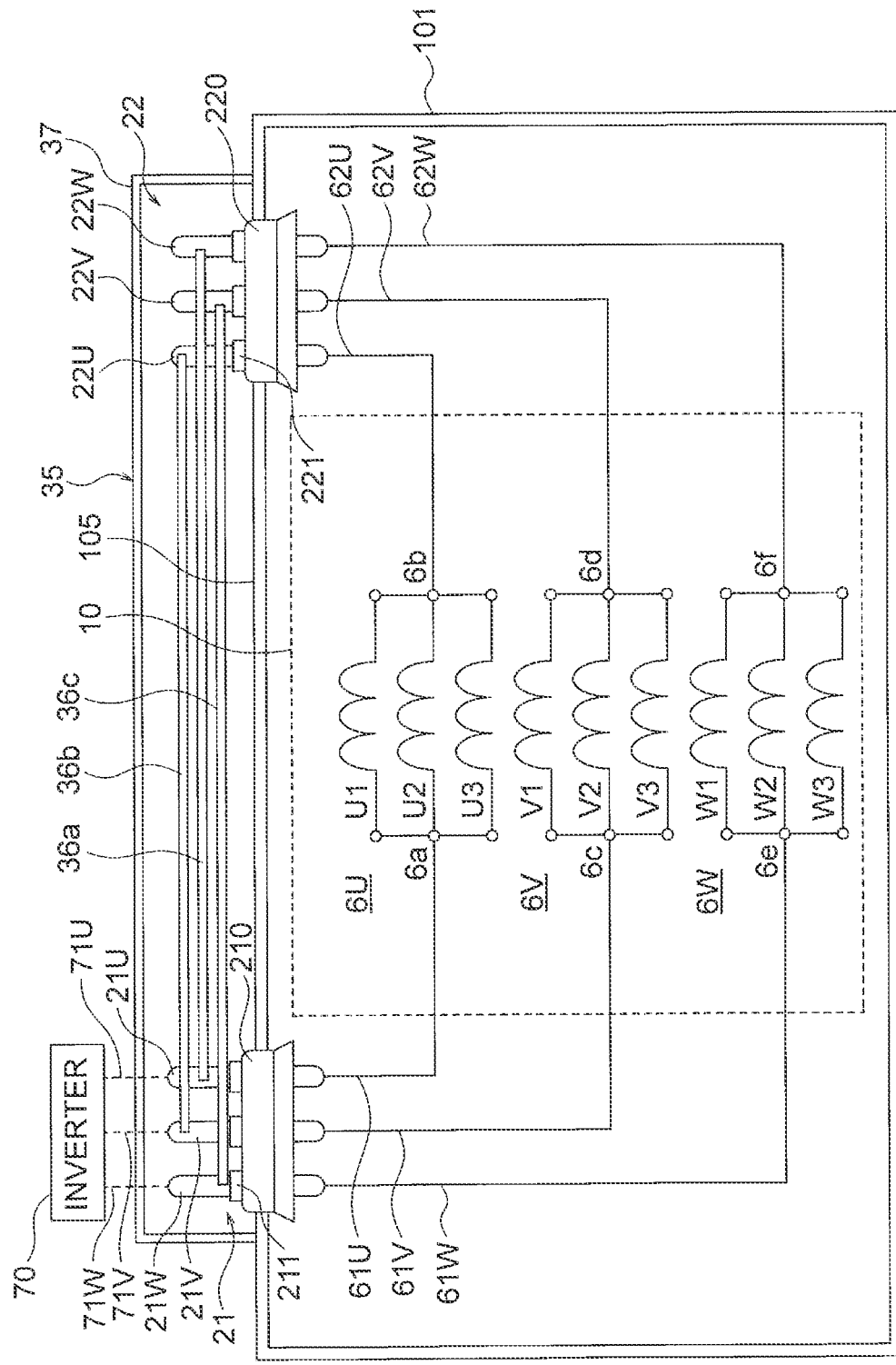
FIG. 23 is a diagram illustrating a manner of connection of the coils of the compressor according to the second embodiment in which the connection state of the coils is fixed to the delta connection.

FIG. 23 is a diagram illustrating a manner of connection of the coils 6U, 6V, and 6W of the compressor 100 according to the second embodiment in which the connection state is fixed to the delta connection. A connection fixing portion 35 is attached to the first terminal portion 21 and the second terminal portion 22.

As in the first embodiment, the connection fixing portion 35 includes a conductor portion 36a connecting the pin 21U and the pin 22W to each other, a conductor portion 36b connecting the pin 21V and the pin 22U to each other, and a conductor portion 36c connecting the pin 21W and the pin 22V to each other.

Figure 24:
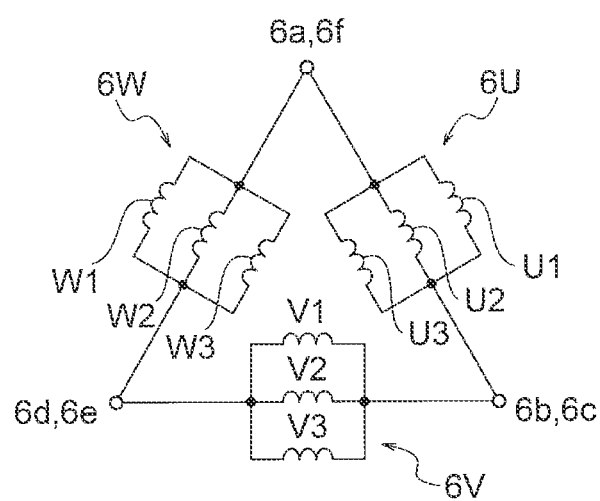
FIG. 24 is a diagram illustrating the connection state of the coils of the compressor of FIG. 23.

FIG. 24 is a diagram illustrating a connection state of the coils 6U, 6V, and 6W of the compressor 100 of FIG. 23. As described above, the first terminal 6a of the coil 6U is connected to the second terminal 6f of the coil 6W, the first terminal 6c of the coil 6V is connected to the second terminal 6b of the coil 6U, and the first terminal 6e of the coil 6W is connected to the second terminal 6d of the coil 6V. Thus, the connection state of the coils 6U, 6V, and 6W is the delta connection.

A state where the coils 6U, 6V, and 6W in which coil elements of each phase are connected in parallel are connected in the delta connection as above will be referred to as a parallel delta connection.

Figure 25:
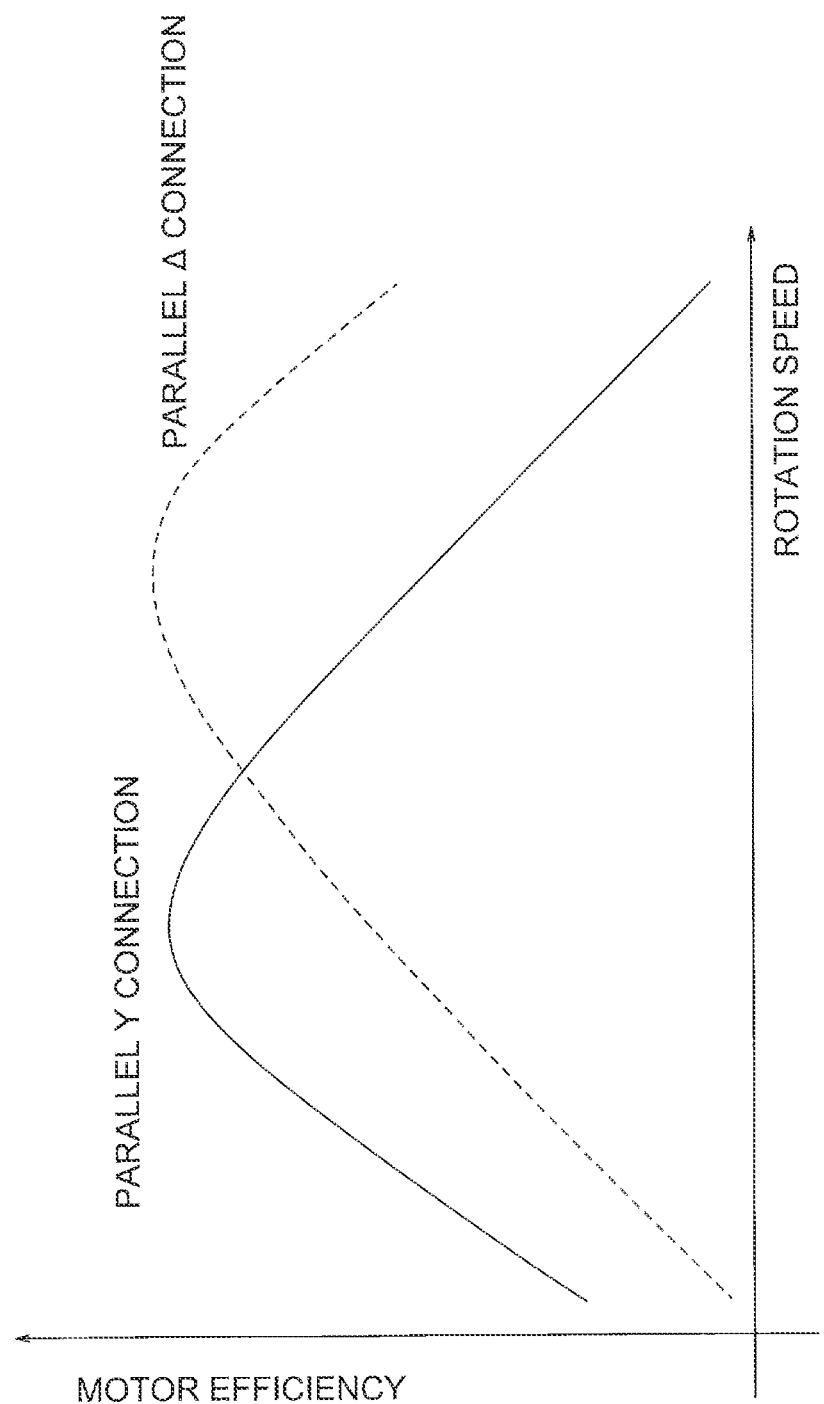
FIG. 25 is a graph showing a relationship between a rotation speed and a motor efficiency of a motor according to the second embodiment for each of the Y connection and the delta connection.

FIG. 25 is a graph showing a relationship between a rotation speed and a motor efficiency of the motor 10 for each of the parallel Y connection and the parallel delta connection. As in the case of the serial connections illustrated in FIG. 18, the parallel Y connection provides a higher motor efficiency in the low-rotation speed range, whereas the parallel delta connection provides a higher motor efficiency in the high-rotation speed range.

Thus, in a case where the maximum rotation speed of the compressor 100 is a low rotation speed, the connection state of the coils 6U, 6V, and 6W is fixed to the Y connection, as illustrated in FIG. 21. In a case where the rotation speed of the compressor 100 is a high rotation speed, the connection state of the coils 6U, 6V, and 6W is fixed to the delta connection, as illustrated in FIG. 23.

Since the first terminal portion 21 and the second terminal portion 22 protrude outside the closed container 101 of the compressor 100, the connection state of the coils 6U, 6V, and 6W can be changed even after the compressor 100 is assembled.

As described above, in the second embodiment, the connection state of the coils 6U, 6V, and 6W can be changed between the parallel Y connection and the parallel delta connection after the motor 10 is incorporated in the compressor 100. Accordingly, it becomes possible to flexibly cope with various specifications of the compressor 100, and the operation efficiency of the compressor 100 can be enhanced.

Since the coils 6U, 6V, and 6W include two or more coil elements of each phase and the two or more coil elements are connected in parallel in the motor 10, a higher motor efficiency can be obtained in the high-rotation speed range, as compared to the case where the coils elements of each phase are connected in series.

Third Embodiment

Figure 26:
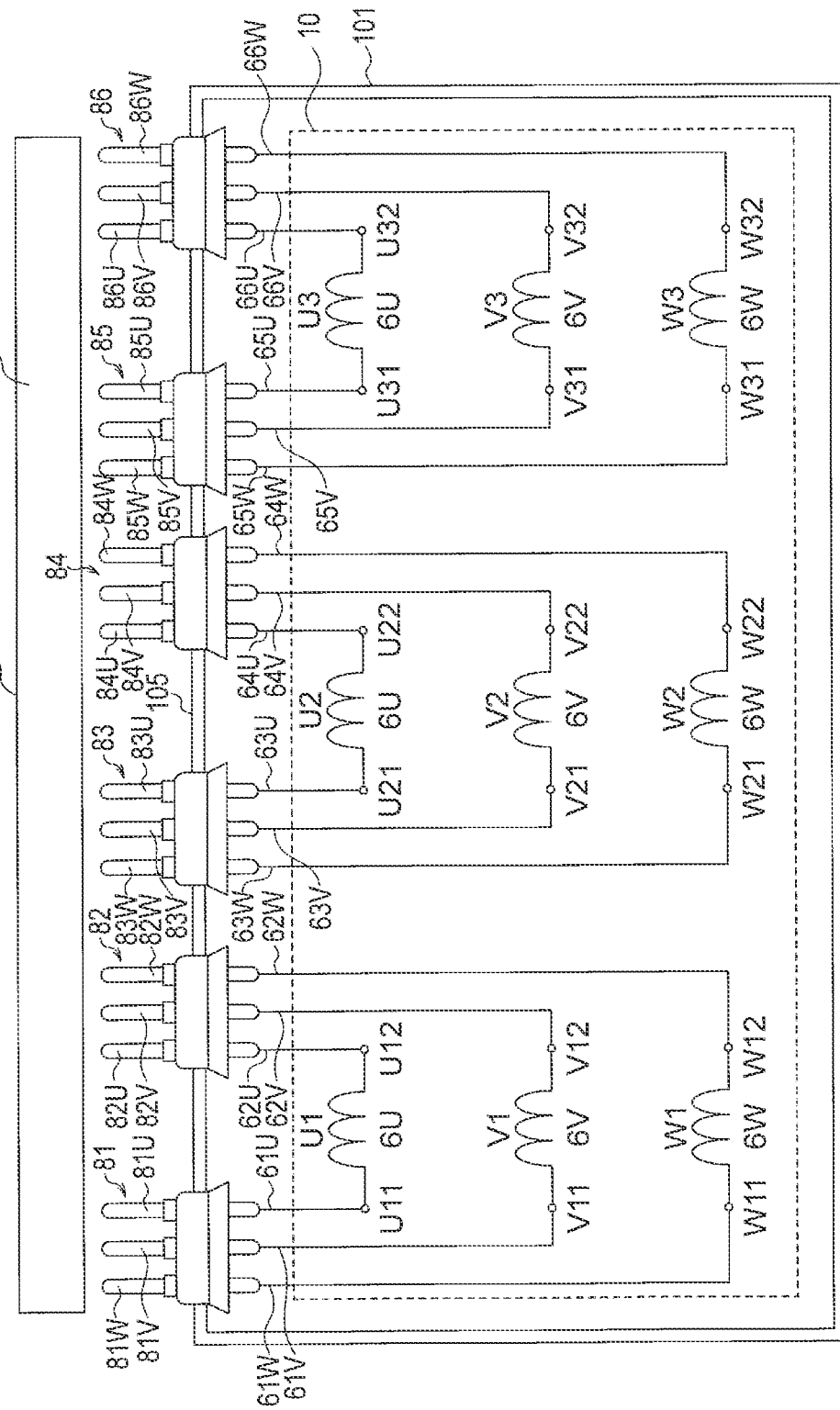
FIG. 26 is a diagram illustrating a manner of connection of coils of a compressor according to a third embodiment.

Next, a third embodiment will be described. FIG. 26 is a diagram illustrating a manner of connection of coils 6U, 6V, and 6W of a compressor 100 according to a third embodiment.

In the first embodiment described above, the connection state of the coils 6U, 6V, and 6W in which coil elements of each phase are connected in series is changeable between the Y connection and the delta connection. In the second embodiment described above, the connection state of the coils 6U, 6V, and 6W in which coil elements of each phase are connected in parallel is changeable between the Y connection and the delta connection.

In contrast, in the third embodiment, the connection state is changeable between the Y connection and the delta connection and is also changeable between the serial connection and the parallel connection. Specifically, the connection state of the coils 6U, 6V, and 6W is changeable among the serial Y connection (FIG. 6), the serial delta connection (FIG. 14), the parallel Y connection (FIG. 22), and the parallel delta connection (FIG. 24).

The compressor 100 according to the third embodiment includes six terminal portions 81 through 86, instead of the first terminal portion 21 and the second terminal portion 22 (FIG. 1) described in the first embodiment. Each of the terminal portions 81 through 86 protrudes outside the closed container 101. As is the case with the first terminal portion 21 (FIG. 5(A)), each of the terminal portions 81 through 86 includes three pins, a base portion, and an insulating portion.

In the third embodiment, the coils 6U, 6V, and 6W include 18 terminals in total. That is, two terminals are provided for each coil element of the coils 6U, 6V, and 6W. When N denotes an integer, the total number of terminals of the coils 6U, 6V, and 6W is represented by 6×N. In this example, N is 3.

A first terminal U11 of a coil element U1 of the coil 6U is connected to a pin 81U of the terminal portion 81 via a lead wire 61U, and a second terminal U12 of the coil element U1 is connected to a pin 82U of the terminal portion 82 via a lead wire 62U.

A first terminal V11 of a coil element V1 of the coil 6V is connected to a pin 81V of the terminal portion 81 via a lead wire 61V, and a second terminal V12 of the coil element V1 is connected to a pin 82V of the terminal portion 82 via a lead wire 62V.

A first terminal W11 of a coil element W1 of the coil 6W is connected to a pin 81W of the terminal portion 81 via a lead wire 61W, and a second terminal W12 of the coil element W1 is connected to a pin 82W of the terminal portion 82 via a lead wire 62W.

A first terminal U21 of a coil element U2 of the coil 6U is connected to a pin 83U of the terminal portion 83 via a lead wire 63U, and a second terminal U22 of the coil element U2 is connected to a pin 84U of the terminal portion 84 via a lead wire 64U.

A first terminal V21 of a coil element V2 of the coil 6V is connected to a pin 83V of the terminal portion 83 via a lead wire 63V, and a second terminal V22 of the coil element V2 is connected to a pin 84V of the terminal portion 84 via a lead wire 64V.

A first terminal W21 of a coil element W2 of the coil 6W is connected to a pin 83W of the terminal portion 83 via a lead wire 63W, and a second terminal W22 of the coil element W2 is connected to a pin 84W of the terminal portion 84 via a lead wire 64W.

A first terminal U31 of a coil element U3 of the coil 6U is connected to a pin 85U of the terminal portion 85 via a lead wire 65U, and a second terminal U32 of the coil element U3 is connected to a pin 86U of the terminal portion 86 via a lead wire 66U.

A first terminal V31 of a coil element V3 of the coil 6V is connected to a pin 85V of the terminal portion 85 via a lead wire 65V, and a second terminal V32 of the coil element V3 is connected to a pin 86V of the terminal portion 86 via a lead wire 66V.

A first terminal W31 of a coil element W3 of the coil 6W is connected to a pin 85W of the terminal portion 85 via a lead wire 65W, and a second terminal W32 of the coil element W3 is connected to a pin 86W of the terminal portion 86 via a lead wire 66W.

A connection fixing portion 38 electrically connects the pins 81U through 86W of the terminal portions 81 through 86 so that the connection state of the coils 6U, 6V, and 6W is one of the serial Y connection (FIG. 6), the serial delta connection (FIG. 14), the parallel Y connection (FIG. 22), or the parallel delta connection (FIG. 24).

In this example, four connection fixing portions 38 respectively corresponding to the serial Y connection (FIG. 6), the serial delta connection (FIG. 14), the parallel Y connection (FIG. 22), and the parallel delta connection (FIG. 24) are provided. Each of the connection fixing portions 38 includes an insulating cover 39 covering the pins 81U through 86W of the terminal portions 81 through 86.

Figure 27:
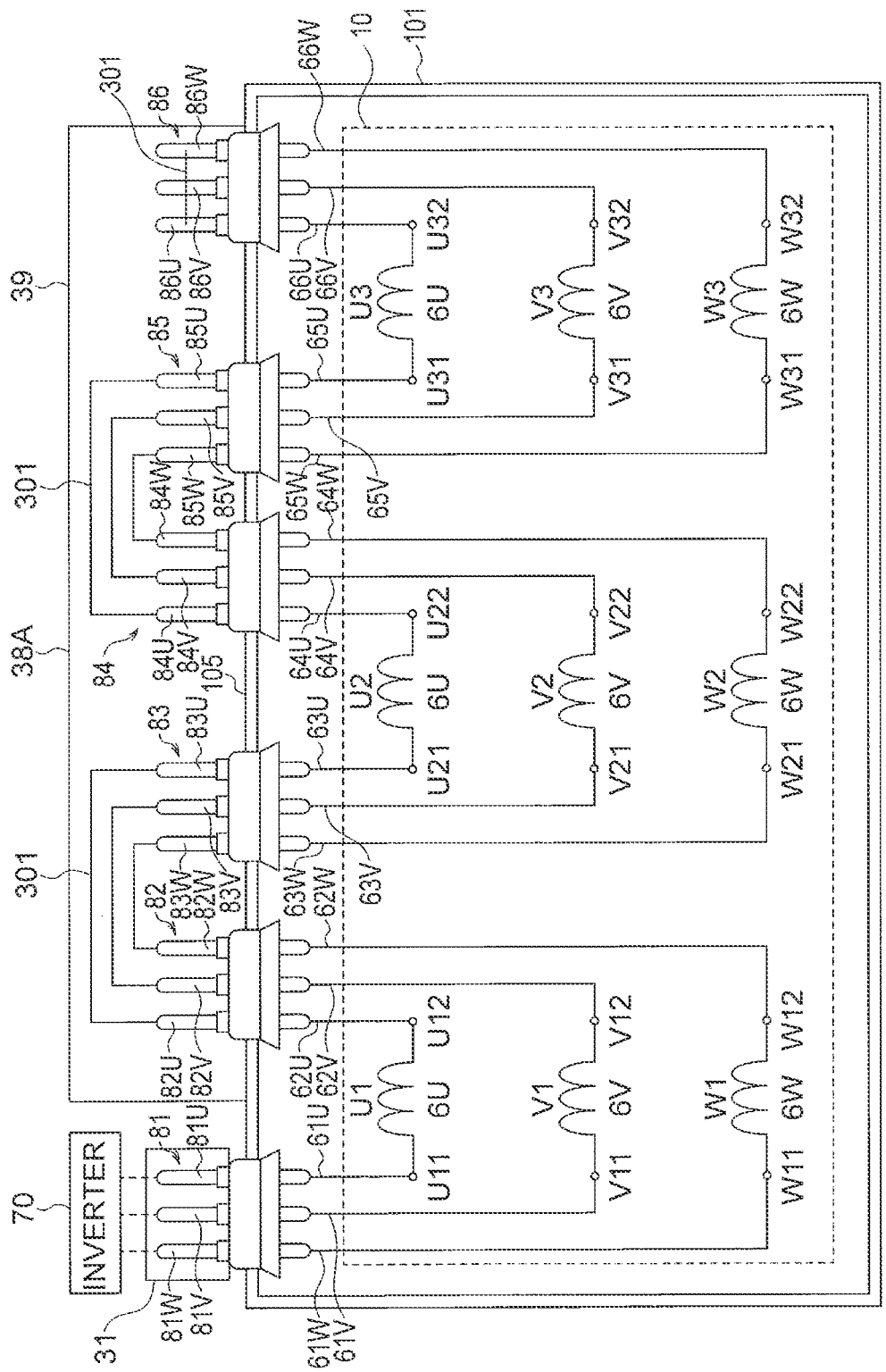
FIG. 27 is a diagram illustrating an example of the manner of connection of the coils of the compressor according to the third embodiment.

For example, the connection fixing portion 38A illustrated in FIG. 27 connects the pins 82U and 83U to each other, connects the pins 84U and 85U to each other, connects the pins 82V and 83V to each other, connects the pins 84V and 85V to each other, connects the pins 82W and 83W to each other, and connects the pins 84W and 85W to each other. Accordingly, the connection state of the coils 6U, 6V, and 6W of each phase is the serial connection.

The connection fixing portion 38A also connects the pins 86U, 86V, and 86W to one another. Accordingly, the connection state of the coils 6U, 6V, and 6W is the serial Y connection (FIG. 6). The inverter connecting portion 31 is connected to the pins 81U, 81V, and 81W of the terminal portion 81. In FIG. 27, conductor portions of the connection fixing portion 38A are denoted by reference numerals 301.

In contrast, although not shown in the figure, in a case where the pins 81U and 86W are connected to each other, the pins 81V and 86U are connected to each other, and the pins 81W and 86V are connected to each other, instead of connecting the pins 86U, 86V, and 86W to one another, the connection state of the coils 6U, 6V, and 6W is the serial delta connection (FIG. 14).

Figure 28:
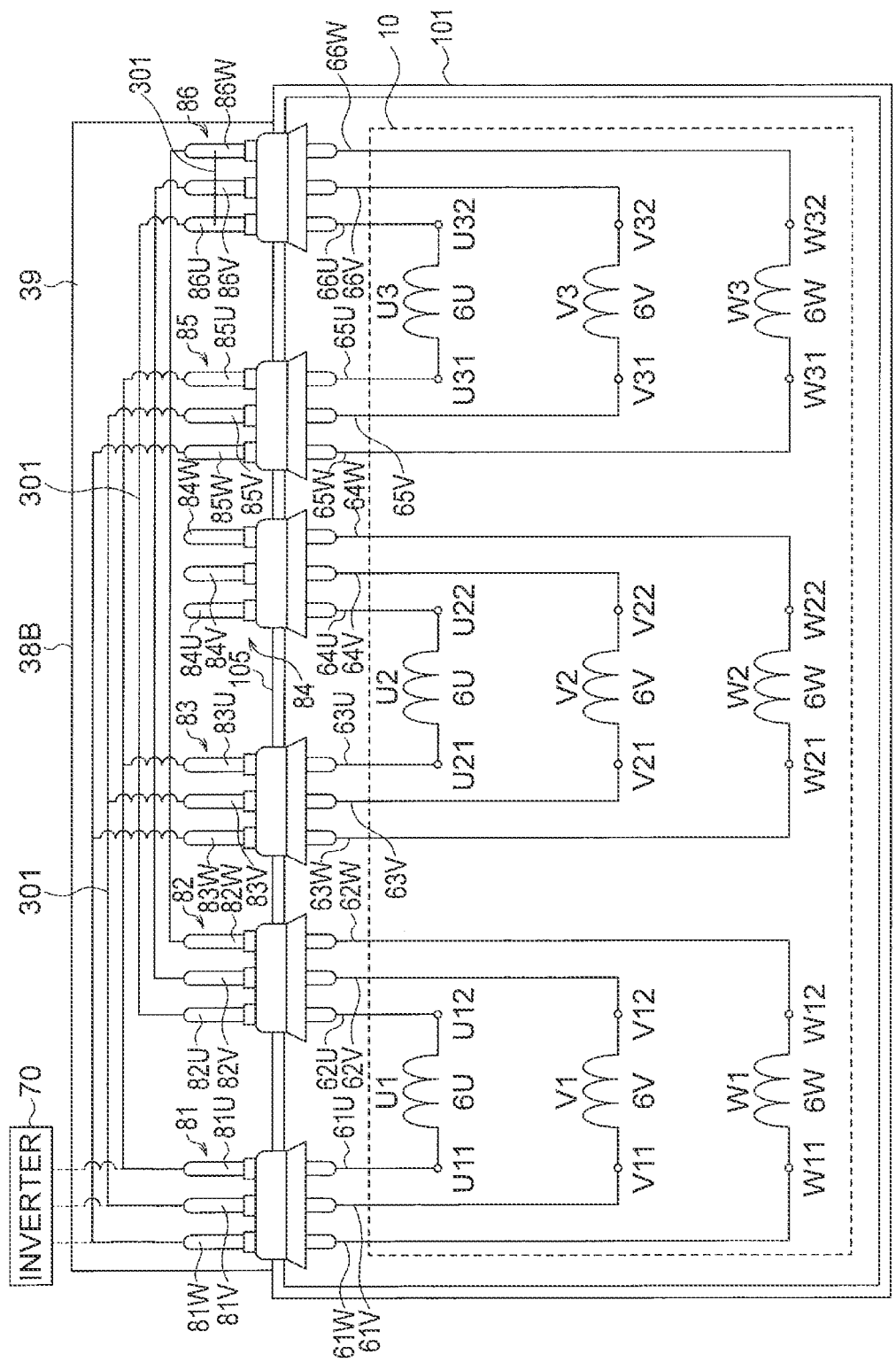
FIG. 28 is a diagram illustrating another example of the manner of connection of the coils of the compressor according to the third embodiment.

The connection fixing portion 38B illustrated in FIG. 28 connects the pins 81U, 83U, and 85U to one another, connects the pins 82U, 84U, and 86U to one another, connects the pins 81V, 83V, and 85V to one another, connects the pins 82V, 84V, and 86V to one another, connects the pins 81W, 83W, and 85W to one another, and connects the pins 82W, 84W, and 86W to one another. Accordingly, the connection state of the coils 6U, 6V, and 6W of each phase is the parallel connection.

The connection fixing portion 38B also connects the pins 86U, 86V, and 86W to one another. Accordingly, the connection state of the coils 6 is the parallel Y connection (FIG. 22). The connection fixing portion 38B connects the pins 81U, 81V, and 81W of the terminal portion 81 to the inverter 70. In FIG. 28, conductor portions of the connection fixing portion 38B are denoted by reference numerals 301.

In contrast, although not shown in the figure, in a case where the pins 81U and 86W are connected to each other, the pins 81V and 86U are connected to each other, and the pins 81W and 86V are connected to each other, instead of connecting the pins 86U, 86V, and 86W to one another, the connection state of the coils 6U, 6V, and 6W is the parallel delta connection (FIG. 24).

Figure 29:
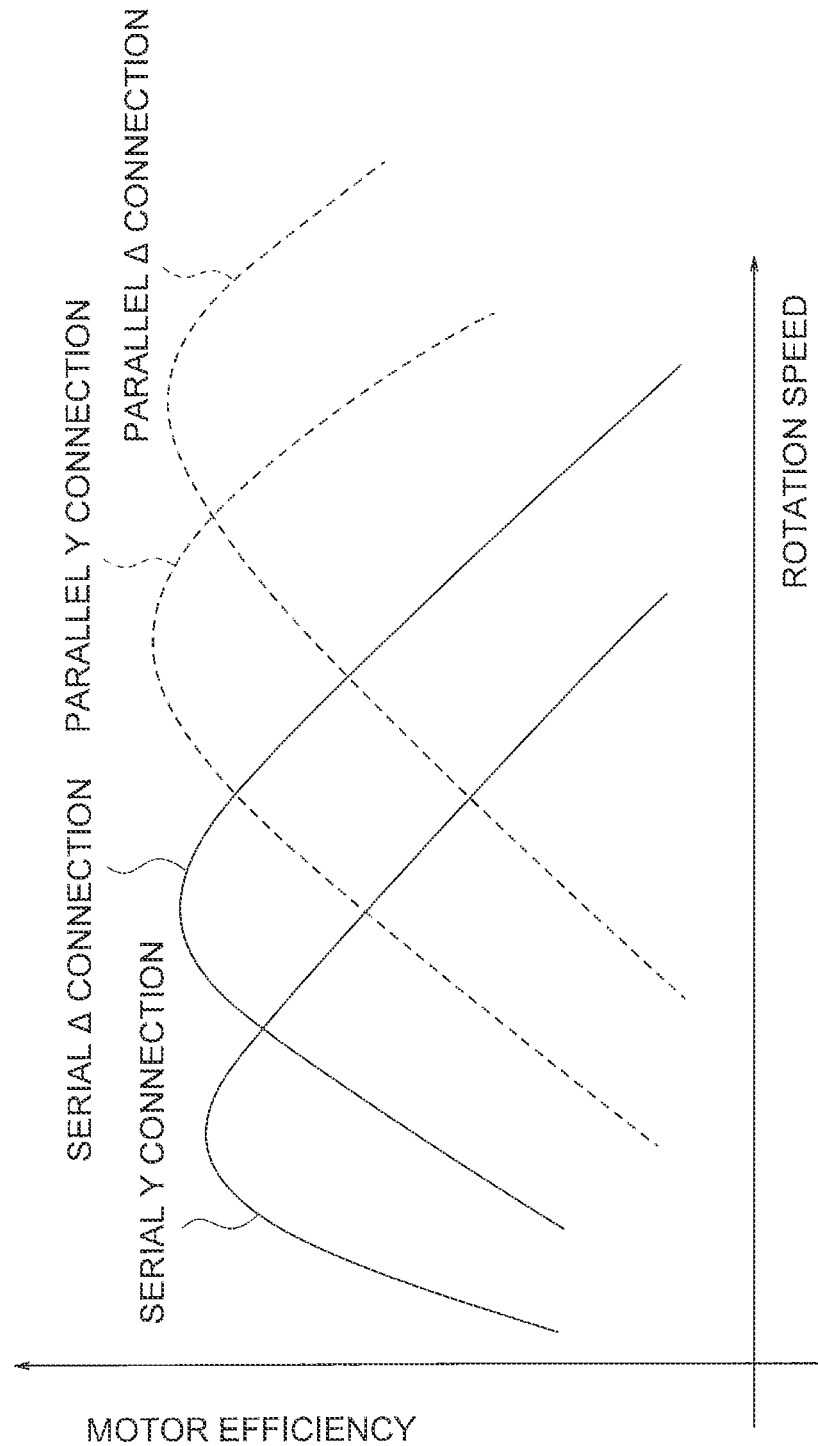
FIG. 29 is a graph showing a relationship between a rotation speed and a motor efficiency of a motor according to the third embodiment for each of a serial Y connection, a serial delta connection, a parallel Y connection, and a parallel delta connection.

FIG. 29 is a graph showing a relationship between a rotation speed and a motor efficiency of the motor 10 for each of the serial Y connection, the serial delta connection, the parallel Y connection, and the parallel delta connection.

M denotes the number of coil elements connected in series or in parallel in each phase of the coils 6U, 6V, and 6W. In the examples illustrated in FIGS. 26 through 28, M is 3. In each phase, an inter-terminal voltage when the M coil elements of each phase are connected in series is 1/M of an inter-terminal voltage when the M coil elements of each phase are connected in parallel.

Thus, the serial Y connection provides a high motor efficiency in the lowest rotation speed range. The serial delta connection provides a high motor efficiency in the second lowest rotation speed range. The parallel Y connection provides a high motor efficiency in the high rotation speed range. The parallel delta connection provides a high motor efficiency in the highest rotation speed range.

Thus, one of the connection fixing portions 38 is selected so that the highest motor efficiency is obtained in accordance with the maximum rotation speed of the compressor 100. Accordingly, an optimum connection state of the coils 6U, 6V, and 6W can be obtained depending on required specifications of the compressor 100, and the high operation efficiency can be obtained.

As described above, in the third embodiment, the connection state of the coils 6U, 6V, and 6W is changeable among the serial Y connection, the serial delta connection, the parallel Y connection, and the parallel delta connection, after the motor 10 is incorporated in the compressor 100. Accordingly, it is possible to flexibly cope with various specifications of the compressor 100, and the operation efficiency of the compressor 100 can be enhanced.

In the first through third embodiments, the coils 6U, 6V, and 6W in which three coil elements of each phase are connected in series or in parallel have been described. However, it is also possible that two coil elements or four or more coil elements of each phase are connected in series or in parallel.

(Air Conditioner)

Next, an air conditioner 400 (also referred to as a refrigeration air conditioning apparatus) to which the compressor 100 of each embodiment is applicable will be described. FIG. 30 is a diagram illustrating a configuration of the air conditioner 400. The air conditioner 400 includes the compressor 100 according to the first embodiment, a four-way valve 401 as a switching valve, a condenser 402 for condensing a refrigerant, a decompressor 403 for decompressing the refrigerant, an evaporator 404 for evaporating the refrigerant, and a refrigerant pipe 410 connecting these elements.

The compressor 100, the four-way valve 401, the condenser 402, the decompressor 403, and the evaporator 404 are connected to one another by the refrigerant pipe 410, and constitute a refrigerant circuit. The air conditioner 400 includes an outdoor fan 405 facing the condenser 402, and an indoor fan 406 facing the evaporator 404.

An operation of the air conditioner 400 is as follows. The compressor 100 sucks in and compresses a refrigerant, and sends out the compressed refrigerant as a high-temperature and high-pressure refrigerant gas. The four-way valve 401 is configured to switch a flow direction of the refrigerant. In a cooling operation, the four-way valve 401 delivers the refrigerant from the compressor 100 to the condenser 402 as indicated by solid lines in FIG. 30.

The condenser 402 exchanges heat between the refrigerant sent from the compressor 100 and outdoor air sent from the outdoor fan 405, condenses the refrigerant, and sends out the refrigerant as a liquid refrigerant. The decompressor 403 expands the liquid refrigerant sent from the condenser 402, and sends out the refrigerant as a low-temperature and low-pressure liquid refrigerant.

The evaporator 404 exchanges heat between indoor air and the low-temperature and low-pressure liquid refrigerant sent from the decompressor 403, evaporates (vaporizes) the refrigerant, and sends out the refrigerant as a refrigerant gas. Air from which heat is taken in the evaporator 404 is supplied by the indoor fan 406 into a room that is a space to be air-conditioned.

In a heating operation, the four-way valve 401 delivers the refrigerant from the compressor 100 to the evaporator 404. In this case, the evaporator 404 functions as a condenser, and the condenser 402 functions as an evaporator.

As described in the first embodiment, the compressor 100 of the air conditioner 400 is configured so that the connection state of the coils 6 of the motor 10 is changeable. Thus, output characteristics of the compressor 100 can be flexibly changed depending on specifications of the air conditioner 400. As a result, the operation efficiency of the air conditioner 400 can be enhanced.

Instead of the compressor of the first embodiment, the compressor of the second or third embodiment may be used. Components except for the compressor 100 in the air conditioner 400 are not limited to the example described above.

Although the preferred embodiments of the present invention have been specifically described above, the present invention is not limited to these embodiments, and various improvements and modifications may be made without departing from the scope of the invention.

What is claimed is:

1. A compressor comprising:
a motor comprising three-phase coils having 6N terminals (where N is an integer);
a compression mechanism driven by the motor;
a closed container in which the motor and the compression mechanism are housed;
a terminal portion electrically connected to the 6N terminals of the coils and protruding outside the closed container;
a conductor portion attached to at least a part of the terminal portion to thereby fix a connection state of the coils; and
an insulating body covering the conductor portion on an outer side of the closed container, wherein the insulating body has holes into which conductors of at least a part of the terminal portion are fitted, and
wherein the conductor portion electrically connects the conductors in the holes to each other to fix a connecting state of the coils.

2. The compressor according to claim 1, wherein the conductor portion electrically connects at least three terminals of the 6N terminals of the coils to one another.

3. The compressor according to claim 1, further comprising a connection terminal portion electrically connected to at least three terminals of the 6N terminals of the coils,
wherein the connection terminal portion is connected to an inverter.

4. The compressor according to claim 1, wherein the terminal portion comprises:
a base member fixed to a wall portion of the closed container,
wherein the conductors comprise pins which are attached to the base member and extend from inside to outside of the closed container.

5. The compressor according to claim 1, wherein the conductor portion fixes the connection state of the coils to a Y connection.

6. The compressor according to claim 1, wherein the conductor portion fixes the connection state of the coils to a delta connection.

7. The compressor according to claim 1, wherein the coils comprise two or more coil elements of each phase, and
wherein the two or more coil elements are connected in series in the motor.

8. The compressor according to claim 1, wherein the coils comprise two or more coil elements of each phase, and
wherein the two or more coil elements are connected in parallel in the motor.

9. The compressor according to claim 1, wherein the coils comprise two or more coil elements of each phase,
wherein the two or more coil elements are not connected to each other in the motor, and
wherein the conductor portion fixes a connection state of the two or more coil elements to a serial connection.

10. The compressor according to claim 1, wherein the coils comprise two or more coil elements of each phase,
wherein the two or more coil elements are not connected to each other in the motor, and
wherein the conductor portion fixes a connection state of the two or more coil elements to a parallel connection.

11. The compressor according to claim 1, wherein the terminal portion is attached to an upper surface portion of the closed container.

12. The compressor according to claim 1, further comprising:
6N lead wires connected to the 6N terminals of the coils; and
a socket connecting the 6N lead wires and the terminal portion to each other.

13. The compressor according to claim 1, wherein the motor comprises:
a stator having the coils and a stator core on which the coils are wound, and
a rotor having a permanent magnet and a rotor core to which the permanent magnet is attached.

14. The compressor according to claim 13, wherein the coils are wound on the stator core by concentrated winding.

15. An air conditioner comprising:
the compressor according to any one of claim 1;
a condenser to condense a refrigerant sent out from the compressor;
a decompressor to decompress the refrigerant condensed by the condenser; and
an evaporator to evaporate the refrigerant decompressed by the decompressor.

16. The compressor according to claim 1, wherein the conductor portion is provided in a substrate formed of an insulating material.

* * * * *